United States Patent
Hayashi et al.

(10) Patent No.: US 11,514,559 B2
(45) Date of Patent: Nov. 29, 2022

(54) IMAGE DISPLAY SYSTEM, IMAGE DISPLAY METHOD, STORAGE MEDIUM, AND MOVING VEHICLE INCLUDING THE IMAGE DISPLAY SYSTEM

(71) Applicant: Panasonic Intellectual Property Management Co., Ltd., Osaka (JP)

(72) Inventors: Shohei Hayashi, Kyoto (JP); Toshiya Mori, Osaka (JP); Tadashi Shibata, Osaka (JP); Nobuyuki Nakano, Aichi (JP); Akira Tanaka, Osaka (JP); Masanaga Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 17/030,621

(22) Filed: Sep. 24, 2020

(65) Prior Publication Data
US 2021/0019867 A1    Jan. 21, 2021

Related U.S. Application Data

(63) Continuation of application No. PCT/JP2019/013091, filed on Mar. 27, 2019.

(30) Foreign Application Priority Data

Mar. 30, 2018   (JP) .............................. JP2018-069740

(51) Int. Cl.
*G06T 5/00*    (2006.01)
*G09G 5/14*    (2006.01)
(Continued)

(52) U.S. Cl.
CPC .............. *G06T 5/006* (2013.01); *B60K 35/00* (2013.01); *G02B 27/0101* (2013.01);
(Continued)

(58) Field of Classification Search
CPC . G06T 5/006; G09G 5/14; G09G 5/38; G09G 2380/10; B60K 2370/1529
See application file for complete search history.

(56) References Cited

U.S. PATENT DOCUMENTS

2008/0088526 A1    4/2008   Kadantseva et al.
2014/0139553 A1    5/2014   Takeda et al.
(Continued)

FOREIGN PATENT DOCUMENTS

JP    2008-108251        5/2008
JP    2009-250827 A    10/2009
(Continued)

OTHER PUBLICATIONS

Official Communication issued in International Patent Application No. PCT/JP2019/013091, dated Jun. 25, 2019, along with an English translation thereof.

*Primary Examiner* — Grace Q Li
(74) *Attorney, Agent, or Firm* — Greenblum & Bernstein, P.L.C.

(57) ABSTRACT

An image display system includes a body, a first correction unit, and a second correction unit. The body houses a display unit to display an image and projects a virtual image, corresponding to the image, onto a target space using outgoing light of the display unit. The first correction unit corrects for distortion of the image. The second correction unit corrects a display location of the image on the display unit in accordance with an orientation signal representing a change in orientation of the body. Each of divisional areas of a display screen of the display unit is assigned with a distortion correction parameter for correcting for the distortion of the virtual image. The first correction unit applies distortion correction to each of the image regions of the image on the display screen based on a distortion correction (Continued)

parameter assigned to a divisional area where the image region is displayed.

9 Claims, 18 Drawing Sheets

(51) Int. Cl.
    *G09G 5/38*     (2006.01)
    *B60K 35/00*     (2006.01)
    *G02B 27/01*     (2006.01)

(52) U.S. Cl.
    CPC .......... *G02B 27/0179* (2013.01); *G09G 5/14* (2013.01); *G09G 5/38* (2013.01); *B60K 2370/1529* (2019.05); *B60K 2370/23* (2019.05); *G02B 2027/011* (2013.01); *G09G 2380/10* (2013.01)

(56) References Cited

U.S. PATENT DOCUMENTS

| | | | | |
|---|---|---|---|---|
| 2016/0357015 A1* | 12/2016 | Yagi | ...................... | B60K 35/00 |
| 2016/0368417 A1* | 12/2016 | Bassi | .................... | H04N 7/181 |
| 2017/0169612 A1* | 6/2017 | Cashen | .................... | G06T 7/50 |
| 2017/0206689 A1* | 7/2017 | Eo | ........................... | G06T 11/60 |
| 2019/0266423 A1* | 8/2019 | Akiba | .................... | G06T 5/006 |
| 2019/0333481 A1* | 10/2019 | Hato | ...................... | B60K 35/00 |
| 2021/0107356 A1* | 4/2021 | Watanabe | ............. | B60K 35/00 |

FOREIGN PATENT DOCUMENTS

| | | |
|---|---|---|
| JP | 2011-117842 A | 6/2011 |
| JP | 2014-103480 | 6/2014 |
| JP | 2014-199385 | 10/2014 |
| JP | 2015-053734 | 3/2015 |
| JP | 2017-016455 | 1/2017 |
| WO | 2016/190135 | 12/2016 |

* cited by examiner

FIG. 9B

| U11 | U12 | U13 | U14 |
|-----|-----|-----|-----|
| U21 | U22 | U23 | U24 |
| U31 | U32 | U33 | U34 |
| U41 | U42 | U43 | U44 |

| U21 | U22 | U23 | U24 |
|-----|-----|-----|-----|
| U31 | U32 | U33 | U34 |
| U41 | U42 | U43 | U44 |
|     |     |     |     |

105 (25)

105s (25s)

IMAGE DISPLAY SYSTEM, IMAGE DISPLAY METHOD, STORAGE MEDIUM, AND MOVING VEHICLE INCLUDING THE IMAGE DISPLAY SYSTEM

CROSS-REFERENCE TO RELATED APPLICATION

This application is a Bypass Continuation of International Application No. PCT/JP2019/013091 filed Mar. 27, 2019, which is based upon and claims the benefit of foreign priority to Japanese Patent Application No. 2018-069740 filed on Mar. 30, 2018, which is assigned to the assignee of the present application. The content of each application is herein incorporated by reference in its entirety.

TECHNICAL FIELD

The present disclosure generally relates to an image display system, an image display method, a storage medium, and a moving vehicle including the image display system. More particularly, the present disclosure relates to an image display system, an image display method, a storage medium, and a moving vehicle including the image display system, all of which are configured or designed to project a virtual image onto a target space.

BACKGROUND ART

A display device (head-up display device) as disclosed in JP 2014-199385 A is known as an exemplary image display system for projecting a virtual image onto a target space. The display device includes a display means, a display control means, a point detecting means, and a storage unit. When an image to present is displayed on the display means, the image to present is projected onto a projected image reflector so as to be recognized by a driver. The driver visually recognizes the virtual image of the image to present, which is superimposed on a real-world environment. The storage unit stores three distortion correction parameters. The three distortion correction parameters are provided for a situation where the driver's viewpoint is located at a left end of a visually recognizable range of the image to present, a situation where his or her viewpoint is located at a middle of the range, and a situation where his or her viewpoint is located at a right end of the range, respectively. The display control means acquires, based on the observer's viewpoint detected by the point detecting means, any of the three distortion correction parameters from the storage unit, thereby correcting for, based on the distortion correction parameter thus acquired, the distortion of the image to present being projected onto the projected image reflector. This configuration allows, even if the observer's viewpoint shifts to the right or to the left, the distortion of the virtual image to be corrected for to improve the visibility of the virtual image.

This display device, however, does not take, into account, misalignment between the virtual image and the real-world environment when the display device changes its orientation. That is to say, when the display device changes its orientation, the virtual image could be misaligned with the real-world environment. In such a situation, the driver would find the virtual image misaligned with the real-world environment to be unnatural.

The present disclosure provides an image display system, an image display method, a storage medium, and a moving vehicle including the image display system, all of which are configured or designed to reduce the degree of misalignment between the virtual image and the real-world environment even when the body changes its orientation, while correcting for the distortion of the virtual image.

SUMMARY

An image display system according to an aspect of the present disclosure includes a body, and an image forming unit. A display unit configured to display an image thereon is provided in the body. The body is configured to project a virtual image, corresponding to the image, onto a target space using outgoing light of the display unit. The image forming unit forms the image to be displayed on the display unit. The image forming unit includes a first correction unit and a second correction unit. The first correction unit corrects for distortion of the image. The second correction unit corrects a display location of the image on the display unit in accordance with an orientation signal representing a change in orientation of the body. A display screen of the display unit has a plurality of divisional areas. The image has a plurality of image regions. Each of the plurality of divisional areas of the display screen is assigned with a distortion correction parameter for use to correct for the distortion of the virtual image. The first correction unit applies distortion correction to each of the plurality of image regions on the display screen based on a distortion correction parameter assigned to a divisional area where the image region is displayed.

A moving vehicle according to another aspect of the present disclosure includes: the image display system described above; a projection unit; and a moving vehicle body. The projection unit is housed in the image display system and is configured to project the virtual image onto a target space using outgoing light of the display unit. The moving vehicle body is provided with the image display system.

An image display method according to still another aspect of the present disclosure is a method for displaying an image using an image display system including a body. A display unit configured to display an image thereon is provided in the body. The body is configured to project a virtual image, corresponding to the image, onto a target space using outgoing light of the display unit. The image display method includes image forming processing. The image forming processing is processing for forming the image to be displayed on the display unit. The image forming processing includes a first correction process and a second correction process. The first correction process includes correcting for distortion of the image. The second correction process includes correcting a display location of the image on the display unit in accordance with an orientation signal representing a change in orientation of the body. A display screen of the display unit has a plurality of divisional areas. The image has a plurality of image regions. Each of the plurality of divisional areas of the display screen is assigned with a distortion correction parameter for use to correct for the distortion of the virtual image. The first correction process includes a distortion correction process to apply distortion correction to each of the plurality of image regions on the display screen based on a distortion correction parameter assigned to a divisional area where the image region is displayed.

A storage medium according to yet another aspect of the present disclosure is a storage medium that stores a program designed to cause a computer to carry out the image display method described above.

BRIEF DESCRIPTION OF DRAWINGS

FIG. 9B is a schematic representation illustrating correspondence between respective divisional areas of a projection area on a windshield and distortion correction parameters;

DESCRIPTION OF EMBODIMENTS

First Embodiment (1) Overview

Figure 1:
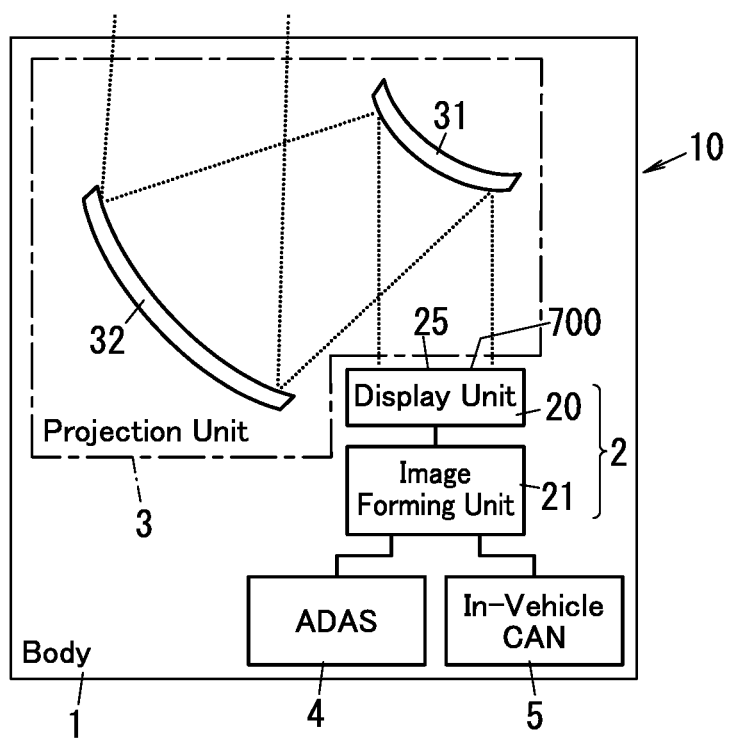
FIG. 1 is a block diagram illustrating a configuration for an image display system according to a first embodiment.

An image display system 10 according to an exemplary embodiment is implemented as a head-up display (HUD) for use in a car 100 as an exemplary moving vehicle body. In this embodiment, an assembly including the image display system 10 and the car 100 (moving vehicle body) equipped with the image display system 10 will be hereinafter referred to as a "moving vehicle."

This image display system 10 is installed in the vehicle cabin of the car 100 so as to project an image onto the windshield 101 (reflector) of the car 100 from under the windshield 101. In the example illustrated in FIG. 2, the image display system 10 is built in a dashboard 102 under the windshield 101. When an image is projected onto the windshield 101 from the image display system 10, the user (driver) 200 recognizes the image projected onto the windshield 101 as a virtual image 300 displayed in the target space 400 set in front of (and outside of) the car 100.

Figure 3:
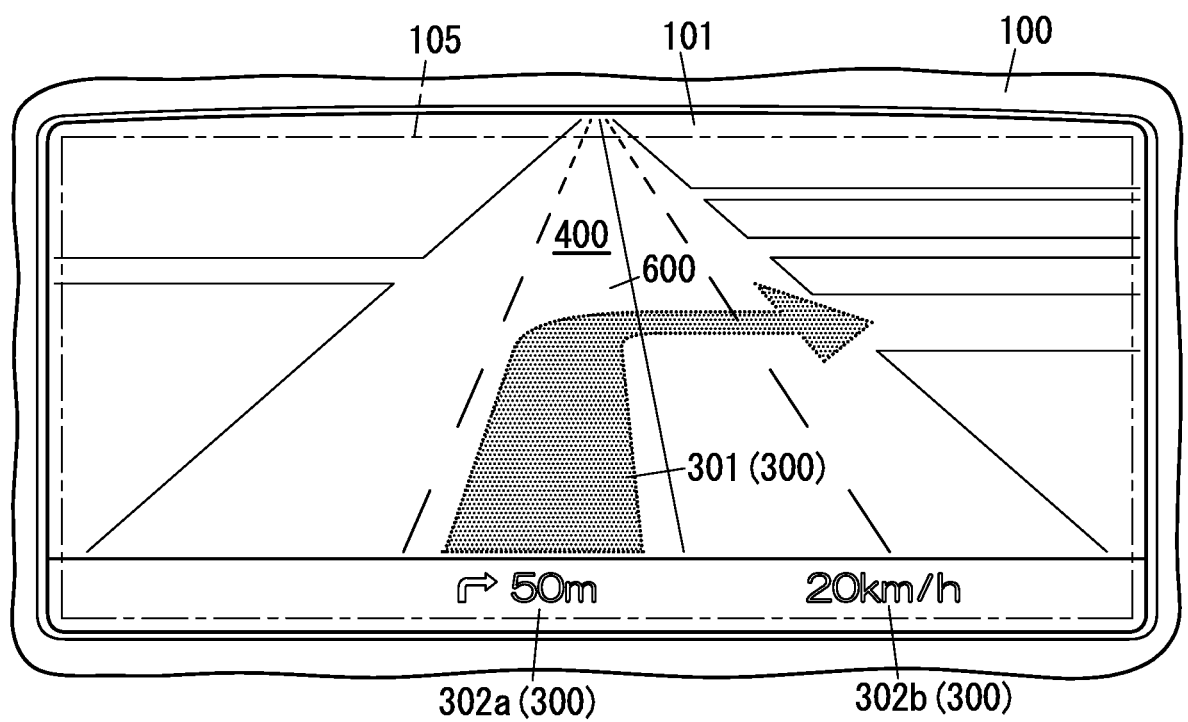
FIG. 3 is a schematic representation illustrating a driver's view in a situation where the image display system is used.

As used herein, the "virtual image" refers to an image formed, as if an object were actually present, on the user's 200 eyes by a diffused (i.e., reflected) light beam, when the image light emerging from the image display system 10 is diffused (i.e., reflected) from a reflector such as the windshield 101 to turn into the diffused light beam. This allows the user 200 who is driving the car 100 to view the virtual image 300 projected by the image display system 10 such that the virtual image 300 is superimposed on his or her view of the real space in front of the car 100 (hereinafter referred to as a "real-world environment") as shown in FIG. 3. Thus, this image display system 10 allows the user 200 to be presented, as the virtual image 300 superimposed on the real-world environment, with, and visually recognize, various types of driver assistance information including vehicle velocity information, navigation information, pedestrian information, foregoing vehicle information, lane deviation information, and vehicle condition information. This allows the user 200 to visually acquire the driver assistance information just by shifting his or her gaze only slightly in the state where he or she is watching the real-world environment in front of the windshield 101.

Note that the windshield 101 is a member having not only a reflection function of reflecting the image light toward the user but also a transmission function of transmitting the light to allow the user to visually recognize the real-world environment through the windshield 101.

The virtual image 300 formed in the target space 400 includes at least two types of virtual images, namely, a first virtual image 301 and second virtual images 302a, 302b. The first virtual image 301 is a piece of navigation information indicating the direction in which the car 100 should travel and may be an arrow image indicating either a right turn or a left turn on the view of a road surface 600. This type of first virtual image 301 is an image displayed by the augmented reality (AR) technique and superimposed at a particular location on the user's 200 view of the real-world environment (such as the road surface 600, a building, surrounding vehicles, and pedestrians).

The second virtual image 302a may be a piece of navigation information indicating, for example, the distance to the nearest crossroads in front of the car 100. Meanwhile, the second virtual image 302b may be vehicle velocity information indicating, for example, the current vehicle velocity of the car 100. These second virtual images 302a, 302b are displayed at a predetermined location (e.g., at the bottom) of the view of the target space 400.

In the example illustrated in FIG. 3, the first virtual image 301 represents, for example, an arrow indicating a "turn right" on the view of a T junction in front of the car 100. The second virtual image 302a represents, for example, "50 m" which indicates the distance to the nearest crossroads. The second virtual image 302b represents, for example, "20 km/h" which indicates the current vehicle velocity of the car 100.

Figure 2:
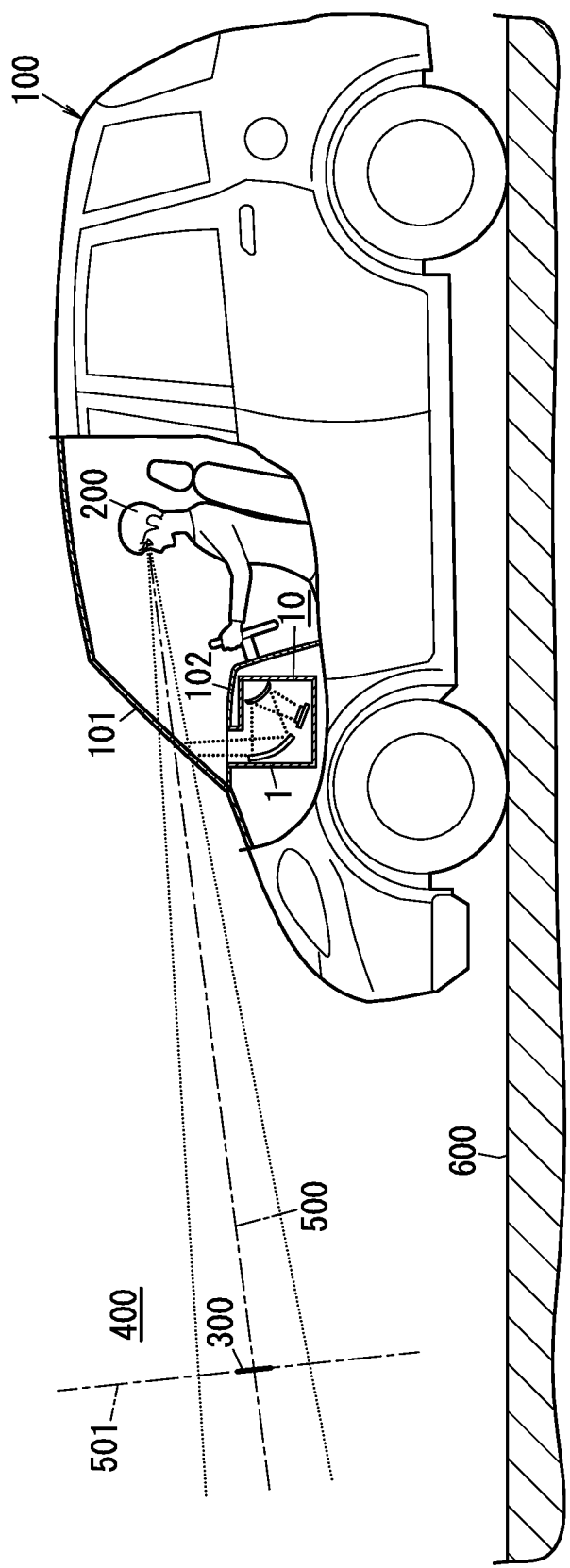
FIG. 2 is a schematic representation illustrating a car equipped with the image display system.

The virtual image 300 displayed in the target space 400 is formed on a virtual plane 501, which intersects with an optical axis 500 of the image display system 10 as shown in FIG. 2. In the target space 400 in front of the car 100, the optical axis 500 extends generally along the road surface 600 in front of the car 100. The virtual plane 501 on which the virtual image 300 is formed intersects with the road surface 600 generally at right angles. For example, if the road surface 600 is a horizontal plane, then the virtual image 300 is displayed along a vertical plane.

As shown in FIG. 1, the image display system 10 includes an image display unit 2, a projection unit 3, and a body 1. The image display unit 2 includes a display screen 25 and displays an image 700 on the display screen 25. The projection unit 3 projects a virtual image 300 corresponding to the image 700 onto the target space 400 with the outgoing light of the image display unit 2. The body 1 houses the image display unit 2 and the projection unit 3 therein.

When such a body 1 is installed in the car 100, the orientation of the body 1 changes with the orientation of the car 100 itself according to, for example, the condition of the road surface 600 and the acceleration or deceleration of the car 100. Specifically, as the car 100 leans forward due to deceleration, for example, the body 1 also leans forward. Likewise, as the car 100 leans backward due to acceleration, for example, the body 1 also leans backward. As the body 1 of the image display system 10 changes its orientation, the relative position of the virtual image 300 with respect to the real-world environment also changes. That is why if the orientation of the body 1 has changed, for example, then the first virtual image 301 is displayed at a location deviated from the particular location where the first virtual image 301 should be superimposed on the user's 200 view of the real-world environment.

Figure 4:
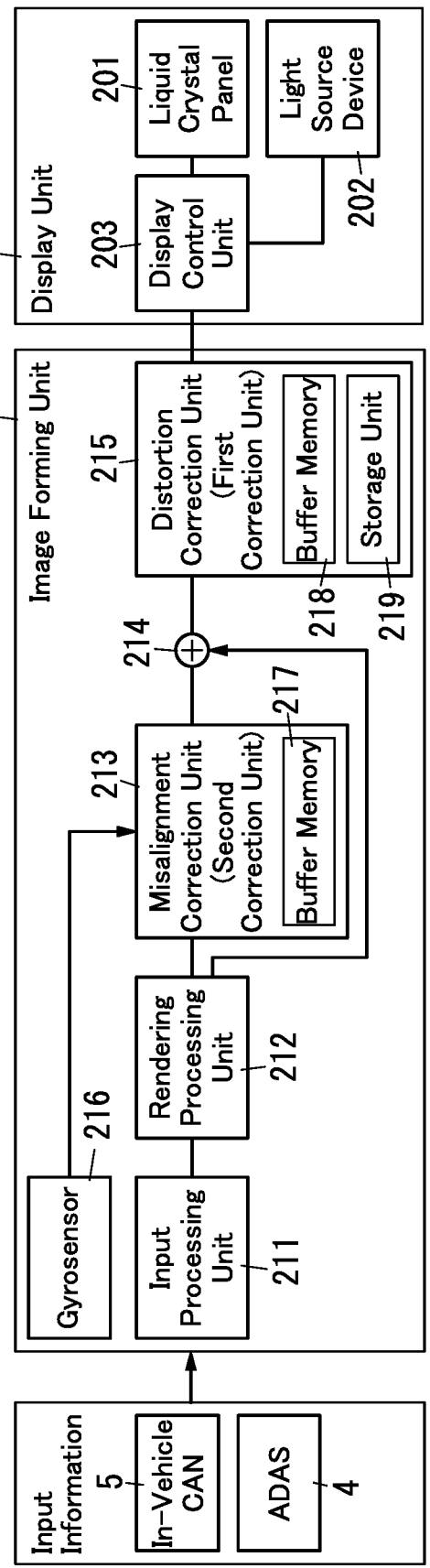
FIG. 4 is a block diagram illustrating a configuration for the image display system.

Thus, the image display system 10 includes a misalignment correction unit (second correction unit) 213 as shown in FIG. 4. The misalignment correction unit 213 corrects, as the body 1 changes its orientation, the display location of the first virtual image 301 in the target space 400 such that the first virtual image 301 is displayed at the particular location in the real-world environment. This allows the display location of the first virtual image 301 to be corrected as the body 1 changes its orientation. This also allows, even if the car 100 has changed its orientation, for example, the image display system 10 to display the first virtual image 301 at the particular location where the first virtual image 301 should be superimposed on the user's 200 view of the real-world environment. In this embodiment, out of the first virtual image 301 and the second virtual images 302, only the display location of the virtual image 301 is corrected as the body 1 changes its orientation, and the display locations of the second virtual images 302 are not corrected. Optionally, the display locations of the second virtual images 302, along with the display location of the first virtual image 301, may be corrected as well.

In the image display system 10, when reflected from the windshield 101, the virtual image 300 will have distortion. Thus, the image display system 10 further includes a distortion correction unit (first correction unit) 215 for correcting for the distortion of the virtual image 300 as shown in FIG. 4.

As can be seen, the image display system 10 includes the misalignment correction unit 213 and the distortion correction unit 215, and therefore, reduces, even if the body 1 changes its orientation, the chances of the virtual image 300 being misaligned significantly with the real-world environment while correcting for the distortion of the virtual image 300.

(2) Configuration

As shown in FIG. 1, the image display system 10 includes the body 1, the image display unit 2, and the projection unit 3. The body 1 may be implemented as a housing, for example. In the body 1, the image display unit 2 and the projection unit 3 are housed. The body 1 is fixed in the dashboard 102 of the car 100. The body 1 does not have to be a housing but may also be a frame, a plate member, or any other suitable member.

The image display unit 2 includes the display screen 25, displays an image 700 on the display screen 25, and casts the image 700 displayed toward the projection unit 3. As shown in FIG. 1, the image display unit 2 includes a display unit 20 and an image forming unit 21. The display unit 20 displays the image 700 and casts the image 700 displayed toward the space in front of itself. The image forming unit 21 performs image forming processing of forming the image 700 to be displayed on the display unit 20.

Figure 5:
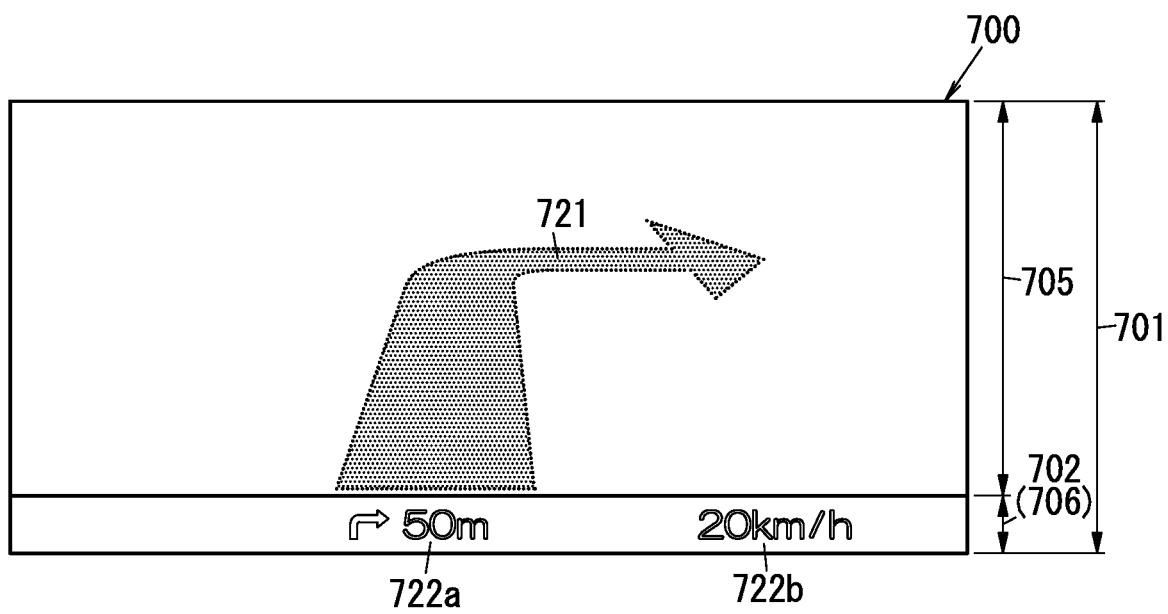
FIG. 5 is a schematic representation illustrating a synthetic image to be displayed on a display unit of the image display system.

The image 700 displayed on the display unit 20 includes a first corresponding image 721 corresponding to the first virtual image 301 and second corresponding images 722a, 722b corresponding to the second virtual images 302a, 302b as shown in FIG. 5. The first corresponding image 721 may be, for example, an arrow image showing a route to the destination for the car 100. The second corresponding images 722a may be, for example, a distance image indicating the distance to the nearest crossroads in front of the car 100. The second corresponding image 722b may be, for example, a vehicle velocity image indicating the current vehicle velocity of the car 100. In the following description, the first corresponding image 721 and the second corresponding images 722a, 722b will be hereinafter also referred to as the arrow image 722, the distance image 722a, and the vehicle velocity image 722b, respectively.

The image 700 is formed by synthesizing together a first image component 701 including the first corresponding image 721 and a second image component 702 including the second corresponding images 722a, 722b as shown in FIG. 5. In this embodiment, the first image component 701 is formed as an image covering the entire screen, while the second image component 702 is formed as an image in the shape of a strip (such as an elongate strip). The image 700 is formed by superimposing the second image component 702 over a bottom portion of the first image component 701. The first corresponding image 721 may be displayed at any arbitrary location within the first image component 701. The second corresponding images 722a, 722b are displayed at a particular location within the second image component (i.e., an elongate strip image) 702. In this embodiment, the second corresponding image 722a is displayed around the middle of the second image component 702 to be located slightly closer to the left end, and the second corresponding image 722b is displayed close to the right end of the second image component 702.

As shown in FIG. 5, the image 700 includes a first region 705 and a second region 706. The first region 705 is a region to be subjected to the correction by the misalignment correction unit 213 and is a region where the first corresponding image 721 is displayed. The first region 705 is a part, where the second image component 702 is not superimposed, of the first image component 701. The second region 706 is a region to be subjected to the correction by the misalignment correction unit 213 and is a region where the second corresponding images 722a, 722b are displayed. The second region 706 agrees with the image region of the second image component 702.

More specifically, the car 100 includes an advanced driver assistance system (ADAS) 4 and an in-vehicle controller area network (CAN) 5. The ADAS 4 is a system for assisting the driver of the car 100 with his or her driving operations and includes information (such as relative positions and velocity) about objects surrounding the car 100 and traffic information such as information about the road condition.

The information about objects surrounding the car 100 is information detected by a sensing unit using a LIDAR, a milli-wave sensor, or a camera. Also, the road condition herein refers to information about specifics of the road surface such as the shapes of white lines on the road surface. The in-vehicle CAN 5 is an in-vehicle network installed in the car 100. For example, a vehicle velocity sensor (not shown) for detecting the vehicle velocity of the car 100 and a car navigation system (not shown) are connected to the in-vehicle CAN 5. This allows information about the vehicle velocity of the car 100 and traffic information such as navigation information to be acquired from the in-vehicle CAN 5.

The image forming unit 21 acquires the navigation information and a detected value of the vehicle velocity sensor (representing the vehicle velocity of the car 100) from the in-vehicle CAN 5, and also acquires traffic information (such as information about the intervals between the car 100 itself and other vehicles surrounding the car 100) from the ADAS 4. The navigation information includes information about the route to the destination to which the car 100 is now heading and information about the distance to the nearest crossroads in front of the car 100.

Then, the image forming unit 21 forms, based on the vehicle velocity information thus acquired with respect to the car 100, the second image component 702 including the vehicle velocity image 722*b* as shown in FIG. 5 and displays the second image component 702 thus formed on the display unit 20. Thus, the second virtual image 302 corresponding to the vehicle velocity image 722*b* (i.e., a virtual image indicating the vehicle velocity of the car 100) is displayed at a predetermined location (e.g., in a lower portion) of the target space 400. This second virtual image 302 may always be displayed while the car 100 is traveling, for example. Optionally, the second image component 702 may include traffic information image (i.e., an image representing traffic information acquired from the ADAS 4) instead of, or in addition to, the vehicle velocity image 722*b*. This allows a virtual image representing the traffic information to be displayed as the second virtual image 302 instead of, or in addition to, the virtual image representing the vehicle velocity of the car 100 itself.

Also, when determining, based on the navigation information thus acquired, that the car 100 should have reached within a given distance from the nearest crossroads in front of the car 100, the image forming unit 21 forms a first image component 701 including the arrow image 721 indicating the traveling direction (i.e., which way to go at the crossroads) as shown in FIG. 5. In addition, the image forming unit 21 also forms, based on the car navigation information described above, a distance image 722*a* indicating the distance to the crossroads, and adds the distance image 722*a* thus formed to the second image component 702 including the vehicle velocity image 722*b*. Then, the image forming unit 21 synthesizes together the first image component 701 and the second image component 702 and outputs the synthetic image thus generated to the display unit 20. Thus, when the car 100 reaches within the given distance from the nearest crossroads in front of the car 100 itself, a first virtual image 301 corresponding to the arrow image 721 is displayed at a particular location within the real-world environment as the target space 400. In addition, a second virtual image 302*a* corresponding to the distance image 722*a* is also displayed at a particular location (e.g., in a lower portion) within the target space 400.

Note that the image forming unit 21 re-acquires the vehicle velocity information and the navigation information at regular time intervals to update the size and display location of the arrow image 721, the distance indicated by the distance image 722*a*, and the vehicle velocity indicated by the vehicle velocity image 722*b*.

Also, as the body 1 changes its orientation, the relative arrangement of the virtual image 300 with respect to the real-world environment also changes. As a result, in the target space 400, the display location of the first virtual image 301 deviates from the originally intended particular overlay location (e.g., at the crossroads) within the real-world environment. For example, as the car 100 leans backward, the user's 200 line of vision tilts upward, thus shifting the real-world environment relatively downward to the user's 200 eye. As a result, in the target space 400, the first virtual image 301 comes to be displayed at a location above the crossroads. Thus, on detecting that the body 1 has changed its orientation, the image forming unit 21 corrects, based on the change in the orientation of the body 1 thus detected, the display location of the first image component 701 on the display screen 25. This allows the display location of the first virtual image 301 to be corrected from the originally intended location (default location) to a location where the virtual image 301 overlays the crossroads within the target space 400.

The projection unit 3 projects a virtual image 300 corresponding to the image 700 onto the target space 400 with the image light emerging from the display screen 25 of the image display unit 2. In this embodiment, the image display system 10 is implemented as a head-up display described above. Thus, the projection unit 3 projects the image 700 onto the windshield 101 (see FIG. 2). The image 700 is projected onto a projection area 105 of the windshield 101 (see FIG. 3).

As shown in FIG. 1, the projection unit 3 includes a first mirror 31 and a second mirror 32. The first mirror 31 and the second mirror 32 are arranged in this order on an optical path of the outgoing light of the image display unit 2. More specifically, the first mirror 31 is arranged in front of the display screen 25 of the image display unit 2 such that the outgoing light of the image display unit 2 is incident on the first mirror 31. The first mirror 31 reflects the outgoing light of the image display unit 2 toward the second mirror 32. The second mirror 32 is arranged at a location on which the outgoing light of the image display unit 2 is incident after having been reflected from the first mirror 31. For example, the second mirror 32 may be arranged below and forward of the first mirror 31. The second mirror 32 reflects upward (i.e., toward the windshield 101) the outgoing light of the image display unit 2 which has already been reflected from the first mirror 31. The first mirror 31 may be configured as a convex mirror, for example. The second mirror 32 may be configured as a concave mirror, for example.

This configuration allows the projection unit 3 to zoom up or down, to an appropriate degree, the image 700 being displayed on the display screen 25 of the image display unit 2 and project the zoomed-up or zoomed-down image onto the windshield 101. As a result, the virtual image 300 is displayed within the target space 400. That is to say, within the view of the user 200 who is driving the car 100, the virtual image 300 of the image 700 projected from the image display system 10 is superimposed on the real-world environment in front of the car 100.

Next, the image forming unit 21 and the display unit 20 will be described in further detail with reference to FIGS. 4-9B.

As shown in FIG. 4, the image forming unit 21 includes an input processing unit 211, a rendering processing unit 212, a misalignment correction unit (second correction unit) 213, an image synthesis unit 214, a distortion correction unit (first correction unit) 215, and a gyrosensor (sensor) 216. In this embodiment, the gyrosensor 216 is used as a sensor. However, this is only an example of the present disclosure and should not be construed as limiting. Alternatively, the gyrosensor 216 may be replaced with any other sensor as long as the sensor is able to detect a change in the orientation of the car 100.

The input processing unit 211 receives various types of information from the ADAS 4 and the in-vehicle CAN 5. For example, the input processing unit 211 may receive, from the in-vehicle CAN 5, various types of car navigation information such as information about the traveling route to the car's 100 destination and the distance to the nearest crossroads in front of the car 100. In addition, the input processing unit 211 also receives information about the vehicle velocity of the car 100 from the in-vehicle CAN 5. The input processing unit 211 outputs the various types of information thus received to the rendering processing unit 212. In addition, the input processing unit 211 also acquires traffic information from the ADAS 4.

The gyrosensor 216 is a sensor for detecting a change in the orientation of the body 1 and may detect a pitch angle of the body 1, for example. The pitch angle of the body 1 is an angle of rotation around an axis extending in the rightward/leftward direction with respect to the body 1. Since the body 1 is fixed to the car 100, a change in the orientation of the body 1 means a change in the orientation of the car 100. Thus, the gyrosensor 216 detects a change in the orientation of the body 1 (i.e., its pitch angle) by detecting a change in the orientation of the car 100 (i.e., its pitch angle). The pitch angle of the car 100 is an angle of rotation around an axis extending in the rightward/leftward direction with respect to the car 100. The gyrosensor 216 outputs, as an orientation signal, information about the change in orientation thus detected to the misalignment correction unit 213. In this embodiment, the gyrosensor 216 is used as a sensor for detecting the change in the orientation of the body 1. However, this is only an example of the present disclosure and should not be construed as limiting. The gyrosensor 216 may be replaced with any other appropriate sensor.

The rendering processing unit 212 separately renders, in accordance with the various types of information provided by the input processing unit 211, the first image component 701 (see FIG. 6B) and the second image component 702 (see FIG. 6A) as respective components of the image 700.

Figure 6A:
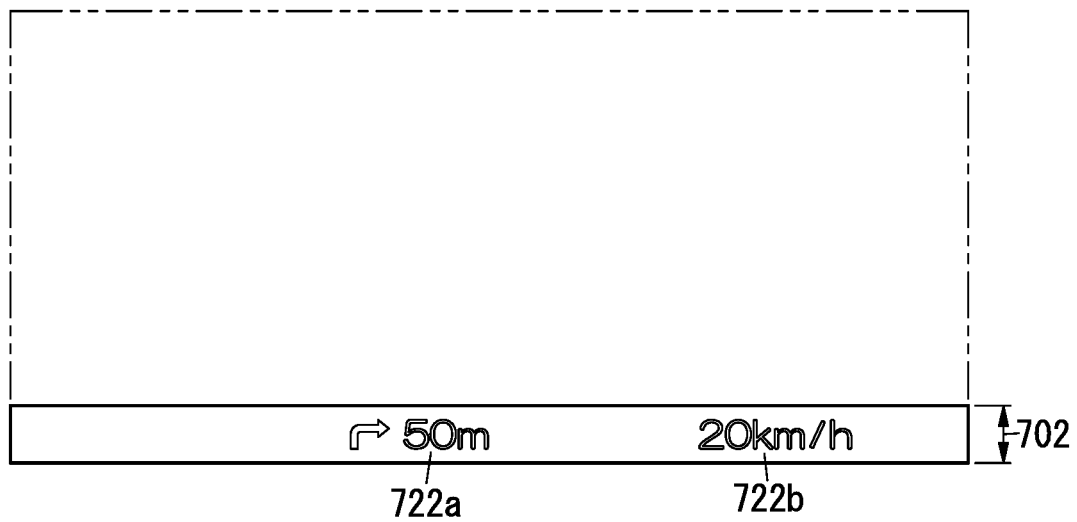
FIG. 6A is a schematic representation illustrating a first image component of the synthetic image.

More specifically, as shown in FIG. 6A, the rendering processing unit 212 renders, based on information about the vehicle velocity of the car 100 included in the various types of information, the vehicle velocity image (second corresponding image) 722b indicating the vehicle velocity of the car 100, for example. In addition, when determining, in accordance with the car navigation information described above, that the car 100 should have reached within a given distance from the nearest crossroads in front of the car 100, the rendering processing unit 212 renders a distance image (second corresponding image) 722a indicating the distance to the crossroads. Then, the rendering processing unit 212 forms a second image component 702 including the distance image 722a and vehicle velocity image 722b thus rendered and outputs the second image component 702 thus formed to the image synthesis unit 214.

On the other hand, when determining that the car 100 should not yet have reached within the given distance from the nearest crossroads in front of the car 100, the rendering processing unit 212 does not render the distance image 722a.

Thus, in that case, the second image component 702 does not include the distance image 722a.

Figure 6B:
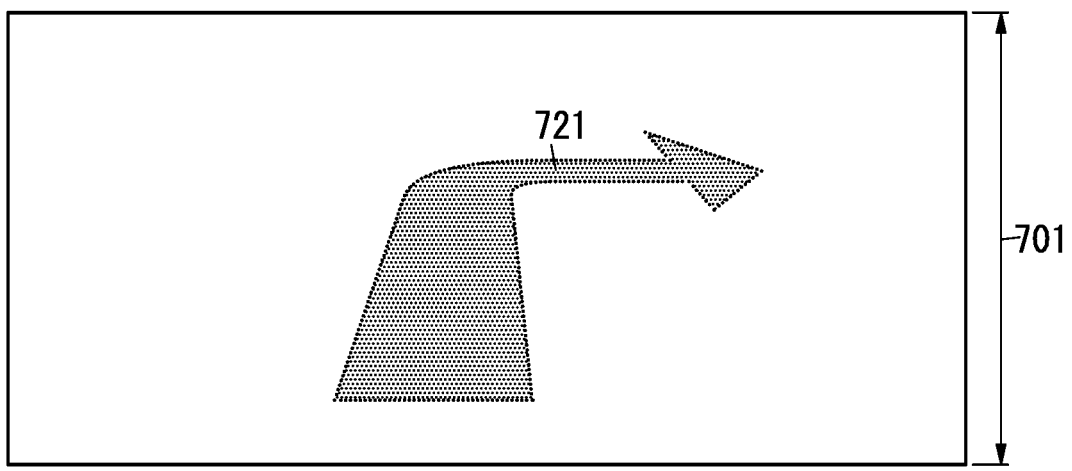
FIG. 6B is a schematic representation illustrating a second image component of the synthetic image.

In addition, the rendering processing unit 212 also determines, based on the car navigation information included in the various types of information as shown in FIG. 6B, that the car 100 should have reached within the given distance from the nearest crossroads in front of the car 100. In that case, the rendering processing unit 212 renders an arrow image (first corresponding image) 721 indicating the route to the destination, forms a first image component 701 including the arrow image 721 thus rendered, and outputs the first image component 701 thus formed to the misalignment correction unit 213.

Note that the rendering processing unit 212 reforms the first image component 701 by updating the display location and size of the arrow image 721 at regular intervals, and outputs the first image component 701 thus reformed to the misalignment correction unit 213. This allows a first virtual image 301 corresponding to the arrow image 721 to be superimposed at a particular location (e.g., at the nearest crossroads in front of the car 100) within the real-world environment as the car 100 travels forward.

In addition, the rendering processing unit 212 reforms the second image component 702 at regular intervals by updating the data of the distance image 722a and vehicle velocity image 722b being displayed into the newest ones, and outputs the second image component 702 thus reformed to the image synthesis unit 214. This allows the data of the second virtual image 302a corresponding to the distance image 722a and the data of the second virtual image 302b corresponding to the vehicle velocity image 722b to be updated into the newest ones.

The misalignment correction unit 213 corrects, in accordance with the orientation signal supplied from the gyrosensor 216 (i.e., in accordance with the change in the orientation of the body 1), the display location of the first image component 701 on the display unit 20. That is to say, as the orientation of the body 1 changes, the relative position of the body 1 with respect to the real-world environment changes accordingly. As a result, the first virtual image 301 is displayed to be superimposed at a location deviated from the originally intended, particular location within the real-world environment. Thus, the misalignment correction unit 213 corrects the display location of the first image component 701 on the display unit 20 such that the first virtual image 301 may be displayed to be superimposed at the originally intended, particular location within the real-world environment. This correction will be hereinafter referred to as "misalignment correction."

More specifically, the misalignment correction unit 213 includes a buffer memory 217 as shown in FIG. 4. The buffer memory 217 is a memory with the ability to temporarily retain one frame of the image and may be implemented as a video RAM (VRAM), for example.

Figure 7:
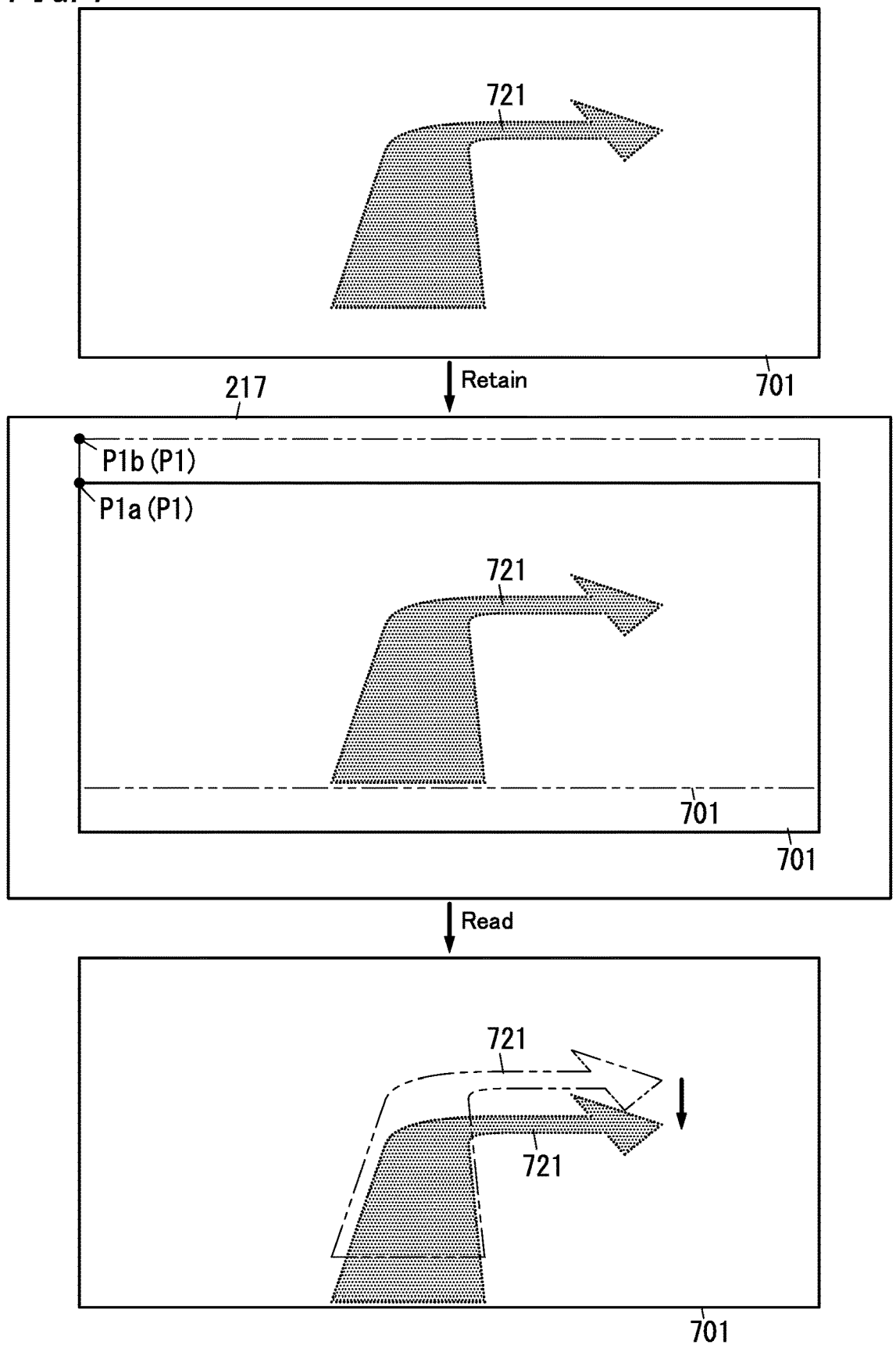
FIG. 7 is a schematic representation illustrating misalignment correction processing.

The misalignment correction unit 213 temporarily retains, in the buffer memory 217, the first image component 701 supplied from the rendering processing unit 212 as shown in FIG. 7. Then, as the body 1 changes its orientation, the misalignment correction unit 213 changes a readout starting point P1 of the buffer memory 217 from a reference point P1a to read out the first image component 701 from the readout starting point P1 thus changed (such as the location P1b). This allows the display location of the first image component 701 to be corrected as the body 1 changes its orientation.

More specifically, on determining, in accordance with the orientation signal supplied from the gyrosensor 216, that the body 1 should have changed its orientation, the misalignment correction unit 213 obtains the variation in the orientation of the body 1 based on the orientation signal. Then, to cancel the variation thus obtained, the misalignment correction unit 213 obtains the magnitude of correction to the display location of the image 700 (see FIG. 5) on the display unit 20. This magnitude of correction is represented by the length, by which the display location of the image 700 needs to be shifted on the display screen 25 of the display unit 20. Then, based on the magnitude of correction thus obtained, the misalignment correction unit 213 changes the readout starting point P1 from the reference point P1$a$ to a point P1$b$ shifted vertically on the first image component 701. Note that the reference point P1$a$ may be located at an upper left corner of the first image component 701 retained, for example. Then, the misalignment correction unit 213 reads out the first image component 701 retained from the readout starting point P1 (point P1$b$) thus changed.

Note that in reading out the first image component 701 retained, the misalignment correction unit 213 reads out one frame of the image, in which the readout starting point P1 is located at the upper left corner of the image read out, as the first image component 701. Thus, as shown in FIG. 7, the display location of the arrow image 721 on the first image component 701 that has been read out (as indicated by the dotted lines) shifts vertically (e.g., downward in the example illustrated in FIG. 7) with respect to the display location of the arrow image 721 on the first image component 701 yet to be read out (as indicated by the two-dot chains). In this manner, the display location of the first image component 701 on the display unit 20 is corrected vertically.

On the other hand, on determining, in accordance with the orientation signal, that the body 1 should not have changed its orientation, the misalignment correction unit 213 sets the readout starting point P1 at the reference point P1$a$ to read out the first image component 701 retained from the readout starting point P1 (reference point P1$a$) that has been set. Thus, in such a situation, the display location of the arrow image 721 on the first image component 701 that has been read out is the same as the display location of the arrow image 721 on the first image component 701 yet to be read out. That is to say, the display location of the first image component 701 on the display unit 20 is not corrected.

Then, the misalignment correction unit 213 outputs the first image component 701 thus read out to the image synthesis unit 214.

As shown in FIG. 5, the image synthesis unit 214 synthesizes together the second image component 702 (see FIG. 6A) supplied from the rendering processing unit 212 and the first image component 701 (see FIG. 6B) supplied from the misalignment correction unit 213 to form the image 700 (see FIG. 5). In this embodiment, the image synthesis unit 214 forms the image 700 by synthesizing together the first image component 701 as one frame of the image and the second image component 702 as an elongate strip image such that the second image component 702 is superimposed over a lower portion of the first image component 701. Then, the image synthesis unit 214 outputs the image 700 thus formed to the distortion correction unit 215.

The distortion correction unit 215 corrects for the distortion of the image 700 displayed on the display unit 20. In this embodiment, the distortion correction unit 215 subjects the image 700 supplied from the image synthesis unit 214 (i.e., the image 700 that has been subjected to correction by the misalignment correction unit 213) to distortion correction. That is to say, the image 700 supplied from the image synthesis unit 214 is displayed on the display screen 25 of the display unit 20 and projected toward the projection area 105 of the windshield 101. Then, the image light of the image 700 projected is reflected from the projection area 105 of the windshield 101 to produce a virtual image 300 in the target space 400. At this time, the image light is distorted when reflected from the projection area 105 of the windshield 101, thus making the virtual image 300 distorted as well. Thus, to eliminate the distortion of the virtual image 300, the distortion correction unit 215 gives the image 700 distortion that cancels the distortion of the virtual image 300.

As shown in FIG. 4, the distortion correction unit 215 includes a buffer memory 218 and a storage unit 219. The buffer memory 218 is a memory that temporarily retains the first image component 701 supplied from the image synthesis unit 214, and may be implemented as a VRAM, for example. The buffer memory 218 has a storage area 220 to retain the first image component 701. The storage unit 219 stores a plurality of (e.g., sixteen) distortion correction parameters U12-U44 (see FIG. 9B) for use in the distortion correction by the distortion correction unit 215.

Figure 8:
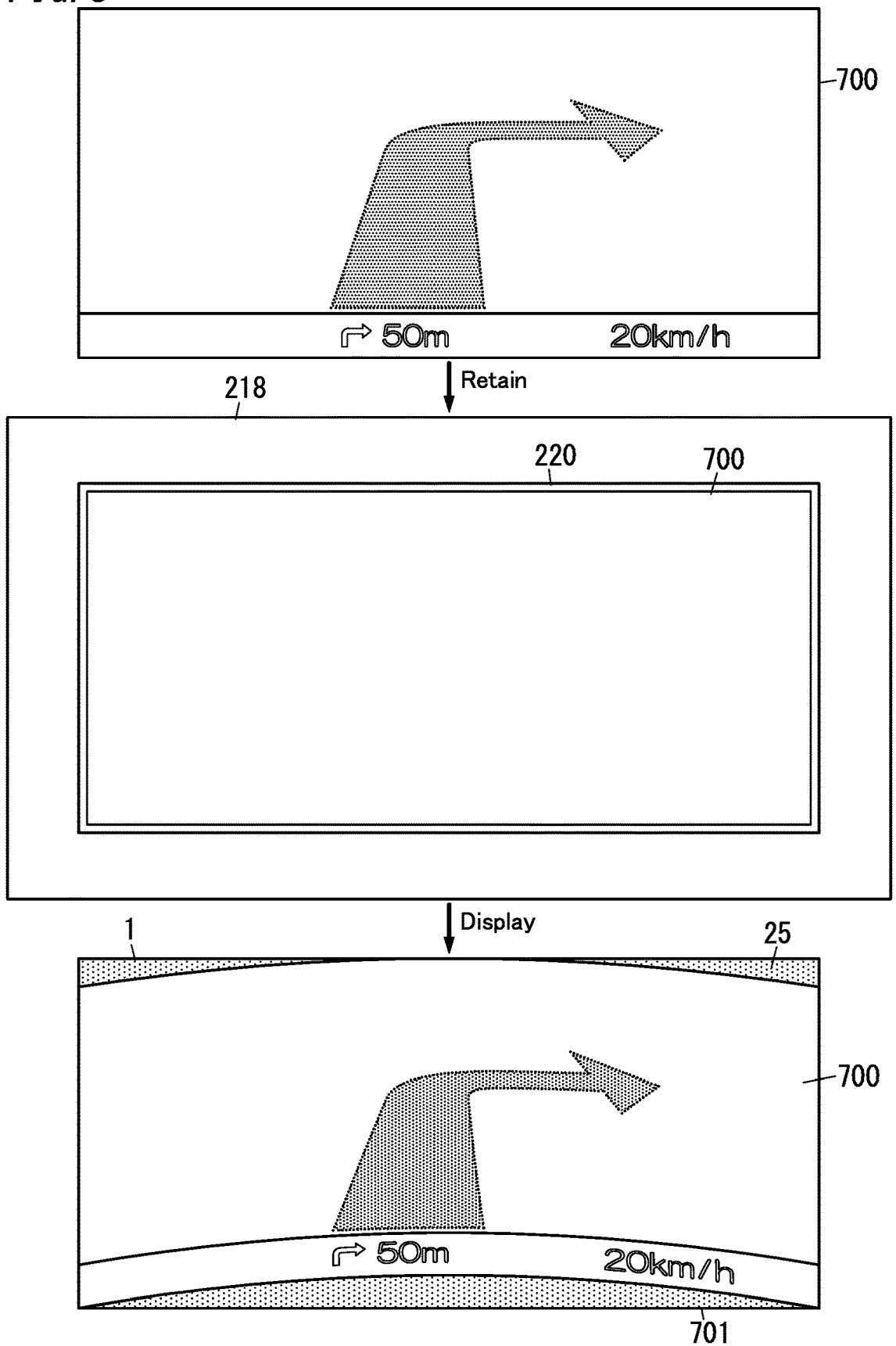
FIG. 8 is a schematic representation illustrating distortion correction processing.

The distortion correction unit 215 temporarily retains, in the storage area 220 of the buffer memory 218, the image 700 supplied from the image synthesis unit 214 as shown in FIG. 8. Then, the distortion correction unit 215 subjects respective parts of the image 700 retained to distortion correction based on the distortion correction parameters U11-U44 stored in the storage unit 219. Then, the distortion correction unit 215 outputs the image 700 thus corrected for to the display unit 20. The image 700 output to the display unit 20 is displayed on the display screen 25 of the display unit 20. The image 700 corrected for by the distortion correction unit 215 (i.e., the image 700 displayed on the display screen 25) has been given distortion that cancels the distortion produced by the reflection from the projection area 105 of the windshield 101.

Figure 9A:
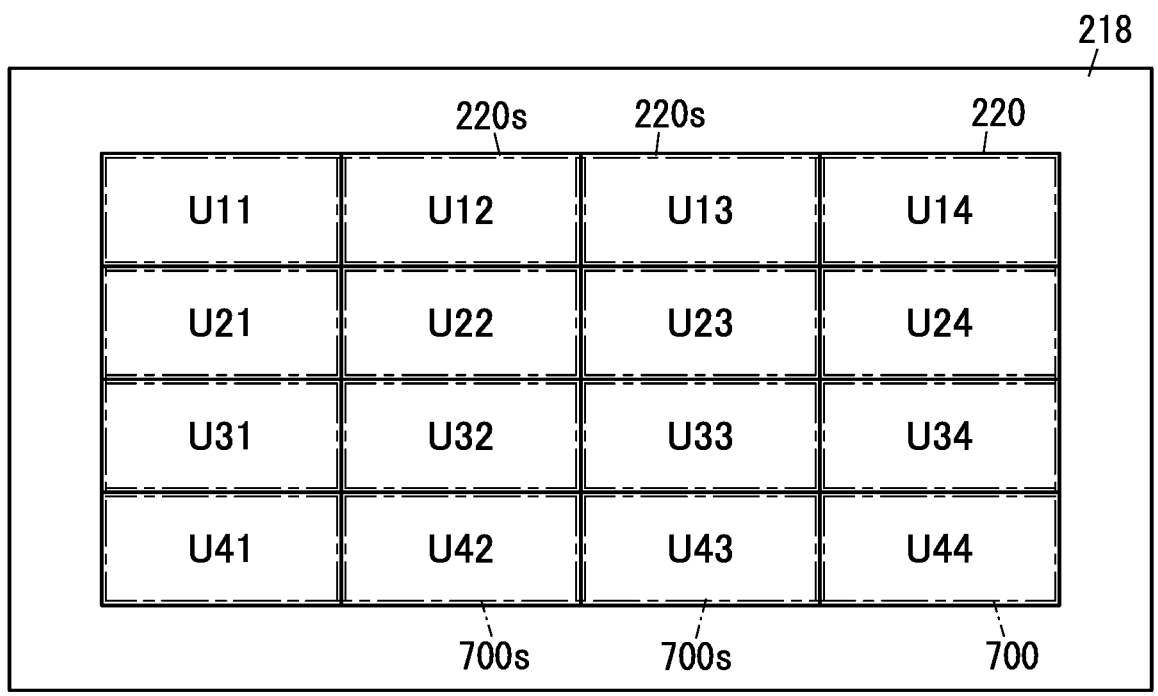
FIG. 9A is a schematic representation illustrating a state where distortion correction parameters are assigned to respective divisional areas for an image to be subjected to the distortion correction.

More specifically, the storage area 220 of the buffer memory 218 includes a plurality of divisional areas 220$s$ as shown in FIG. 9A. Likewise, the display screen 25 of the display unit 20 also has a plurality of divisional areas 25$s$ (first divisional areas) and the projection area 105 of the windshield 101 also has a plurality of divisional areas 105$s$ (second divisional areas) as shown in FIG. 9B. The respective divisional areas 220$s$, the divisional areas 25$s$, and the divisional areas 105$s$ are divided from each other both vertically and horizontally to form a mesh of divisional areas. In the example illustrated in FIGS. 9A and 9B, each set of divisional areas 220$s$, 25$s$, and 105$s$ consists of 16 divisional areas arranged in a four by four matrix. Each divisional area 220$s$, 25$s$, 105$s$ has a size corresponding to a plurality of pixels. However, this is only an example of the present disclosure and should not be construed as limiting. The size of each divisional area 220$s$, 25$s$, 105$s$ does not have to correspond to a plurality of pixels but may correspond to a single pixel as well.

The respective divisional areas 220$s$ of the storage area 220 correspond one to one to respective divisional areas 25$s$ of the display screen 25. The respective divisional areas 25$s$ of the display screen 25 correspond one to one to respective divisional areas 105$s$ of the projection area 105. That is to say, in each divisional area 220$s$ of the storage area 220, a corresponding divisional area 25$s$ of the display screen 25, and a corresponding divisional area 105$s$ of the projection area 105, the same portion of the image 700 is retained, displayed, or reflected.

As shown in FIG. 9B, each of the distortion correction parameters U11-U44 is assigned to one of the divisional areas 105$s$ of the projection area 105. Each distortion correction parameter U11-U44 has such a value that cancels (corrects) the distortion produced when the outgoing light of the display unit 20 is reflected from the divisional area 105s assigned with the distortion correction parameter U11-U44 (hereinafter referred to as an "associated divisional area 105s"). Note that each of the distortion correction parameters U11-U44 may be set as a function expression with respect to a representative point of an associated divisional area 105s (e.g., an upper left corner point) of the projection area 105, or may also be a numerical value assigned to an associated divisional area 105s of the projection area 105. Note that since each divisional area 105s of the projection area 105 corresponds to one of the divisional areas 25s of the display screen 25, each of the distortion correction parameters U11-U44 is also assigned to one of the divisional areas 25s of the display screen 25.

When the image 700 supplied from the image synthesis unit 214 is retained in the storage area 220 of the buffer memory 218, the distortion correction unit 215 divides the image 700 retained into plurality of image regions 700s corresponding to the respective divisional areas 220s of the storage area 220 as shown in FIG. 9A. Since the respective image regions 700s of the image 700 correspond to the respective divisional areas 220s of the storage area 220, the respective image regions 700s of the image 700 also correspond to the respective divisional areas 25s of the display screen 25 and the respective divisional areas 105s of the projection area 105.

Then, the distortion correction unit 215 subjects each of the image regions 700s of the image 700 retained in the storage area 220 to distortion correction by using a distortion correction parameter U11-U44 assigned to the corresponding divisional area 25s of the projection area 105. In FIG. 9A, in each image region 700s of the image 700, shown is a distortion correction parameter U11-U44 assigned to the image region 700s. Thus, each of the image regions 700s of the image 700 is subjected to distortion correction with a distortion correction parameter U11-U44 shown in the image region 700s.

Note that each distortion correction parameter U11-U44 is also assigned to one of the divisional areas 25s of the display screen 25. Thus, each of the divisional areas 25s of the display screen 25 is also associated with one of the distortion correction parameters U11-U44. Also, each image region 700s of the image 700 is subjected to distortion correction using one of the distortion correction parameters U11-U44 that is assigned to the divisional area 25s of the display screen 25 where the image region 700s is displayed.

Making this distortion correction allows reverse distortion given to each image region 700s of the image 700 when the image 700 is projected onto the projection area 105 to cancel the distortion produced in the image light by being reflected from the corresponding divisional area 105s of the projection area 105, thus making the virtual image 300 free of distortion.

As shown in FIG. 4, the display unit 20 includes a liquid crystal panel 201, a light source device 202, and a display control unit 203. The liquid crystal panel 201 displays the image 700 formed by the image forming unit 21. The light source device 202 casts the image 700 displayed on the liquid crystal panel 201 toward a space in front of the liquid crystal panel 201. The display control unit 203 controls the liquid crystal panel 201 and the light source device 202.

The liquid crystal panel 201 may be implemented as, for example, a liquid crystal display (LCD). The liquid crystal panel 201 is arranged in front of the light source device 202. The front surface (i.e., the surface opposite from the light source device 202) of the liquid crystal panel 201 serves as the display screen 25. The image 700 is displayed on the display screen 25.

The light source device 202 is used as a backlight for the liquid crystal panel 201. The outgoing light of the light source device 202 is transmitted through the liquid crystal panel 201 and cast forward from the display screen 25. The light source device 202 may be a surface emitting light source for irradiating an almost entire rear surface of the liquid crystal panel 201 with light using a solid-state light-emitting element such as a light-emitting diode or a laser diode.

The display control unit 203 has the image 700 displayed on the display screen 25 by driving the liquid crystal panel 201 based on the image 700 supplied from the image forming unit 21 to the display unit 20. In addition, the display control unit 203 turns the light source device 202 ON to have the image 700 displayed on the liquid crystal panel 201 cast toward a space in front of the liquid crystal panel 201. The light cast forward of the liquid crystal panel 201 at this time is image light, i.e., light reflecting the image 700 displayed on the liquid crystal panel 201. Therefore, the image displayed on the liquid crystal panel 201 is projected forward of the liquid crystal panel 201 with the outgoing light of the light source device 202.

The rendering processing unit 212, the misalignment correction unit 213, the distortion correction unit 215, and the display control unit 203 are each implemented as a microcomputer (computer system) including a processor such as a central processing unit (CPU) and a memory. That is to say, the rendering processing unit 212, the misalignment correction unit 213, the distortion correction unit 215, and the display control unit 203 are each implemented as a computer including a processor and a memory. The computer performs the function of the rendering processing unit 212, the misalignment correction unit 213, the distortion correction unit 215, or the display control unit 203 by making the processor execute a program stored in the memory. In this embodiment, the program is stored in advance in the memory. However, this is only an example and should not be construed as limiting. The program may also be downloaded via a telecommunications line such as the Internet or distributed after having been stored in a storage medium such as a memory card.

The image display system 10 with this configuration allows, even when the body 1 changes its orientation, misalignment between the virtual image 300 and the real-world environment to be reduced significantly with the distortion of the virtual image 300 corrected for. More specifically, providing the distortion correction unit 215 and the misalignment correction unit 213 allows not only the distortion of the virtual image 300 to be corrected for but also the display location of the virtual image 300 to be corrected as well, as the body 1 changes its orientation. In this case, each of the plurality of divisional areas 25s on the display screen 25 of the display unit 20 is assigned with a distortion correction parameter U11-U44 associated with the divisional area 25s. The distortion correction unit 215 applies distortion correction to each of the plurality of image regions 700s of the image 700 based on the distortion correction parameter U11-U44 assigned to the divisional area 25s on the display screen 25 where the image region 700s of the image 700 is displayed. This allows, even when the display location of the image 700 is corrected by the misalignment correction unit 213, the distortion of the virtual image 300 to be corrected for appropriately through the distortion correction applied by the distortion correction unit 215.

Second Embodiment

In the first embodiment described above, the misalignment correction (i.e., correction to the display location of the image 700 on the display unit 20) is followed by the distortion correction (i.e., correction for the distortion of the image 700). In this second embodiment, the distortion correction is followed by the misalignment correction. In the following description, any constituent element of the second embodiment, having the same function as a counterpart of the first embodiment described above, will be designated by the same reference numeral as that counterpart's, and a detailed description thereof will be omitted herein. The following description of the second embodiment will be focused on differences from the first embodiment.

Figure 10:
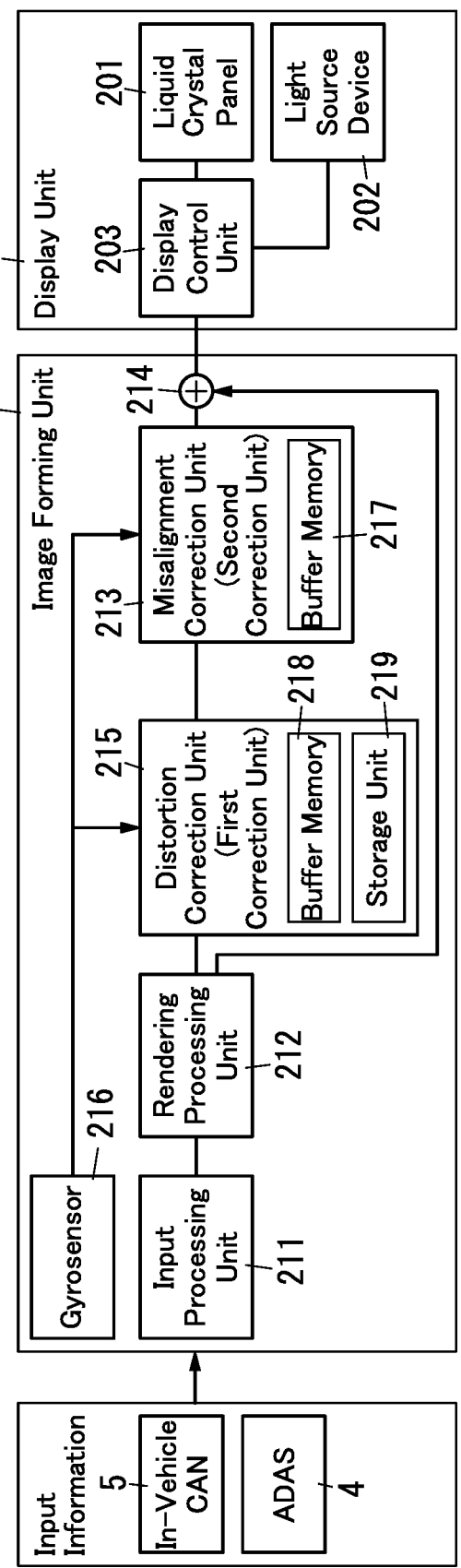
FIG. 10 is a block diagram illustrating a configuration for an image display system according to a second embodiment.

In the image forming unit 21 according to the second embodiment, the misalignment correction unit 213, the image synthesis unit 214, and the distortion correction unit 215 perform their respective processing in a different order as shown in FIG. 10 from their counterparts of the image forming unit 21 according to the first embodiment shown in FIG. 4. More specifically, the distortion correction unit 215 (first correction unit) is arranged behind the rendering processing unit 212, the misalignment correction unit 213 (second correction unit) is arranged behind the distortion correction unit 215, and the image synthesis unit 214 is arranged behind the misalignment correction unit 213.

Specifically, the second image component 702 rendered by the rendering processing unit 212 is output to the image synthesis unit 214. Meanwhile, the first image component 701 rendered by the rendering processing unit 212 is output to the distortion correction unit 215. The distortion correction unit 215 applies distortion correction to the first image component 701 rendered by the rendering processing unit 212 and outputs the first image component 701 thus corrected for to the misalignment correction unit 213. The misalignment correction unit 213 corrects the display location on the display unit 20 of the first image component 701 that has been subjected to the distortion correction by the distortion correction unit 215 and outputs the first image component 701 thus corrected for to the image synthesis unit 214. In response, the image synthesis unit 214 synthesizes together the second image component 702 supplied from the rendering processing unit 212 and the first image component 701 supplied from the misalignment correction unit 213 to form the image 700. Then, the image synthesis unit 214 outputs the image 700 thus formed to the display unit 20.

In the second embodiment, the distortion correction is followed by the misalignment correction. Thus, the distortion correction unit 215 makes the distortion correction with its distortion correction range shifted by the magnitude of correction to be applied later to the display location of the image 700 on the display unit 20 by the misalignment correction unit 213.

Specifically, the distortion correction unit 215 predicts, based on the orientation signal supplied from the gyrosensor 216, the magnitude of correction that the misalignment correction unit 213 will apply to the display location of the image 700. More specifically, the distortion correction unit 215 obtains, based on the orientation signal supplied from the gyrosensor 216, the magnitude of correction through the same processing as the one to be performed subsequently by the misalignment correction unit 213. If the time interval between the start of the distortion correction processing by the distortion correction unit 215 and the start of the misalignment correction processing by the misalignment correction unit 213 that follows the distortion correction unit 215 is sufficiently short, the magnitude of correction obtained by the distortion correction unit 215 becomes an approximate value of the magnitude of correction obtained by the misalignment correction unit 213 that follows the distortion correction unit 215. Thus, the magnitude of correction obtained by the distortion correction unit 215 may be used as the magnitude of correction when the misalignment correction unit 213 following the distortion correction unit 215 corrects the display location of the image 700.

Note that if the time interval between the start of distortion correction processing by the distortion correction unit 215 and the start of misalignment correction processing by the misalignment correction unit 213 following the distortion correction unit 215 is not sufficiently short, then the magnitude of correction may be predicted by using a predictor. More specifically, in that case, using the orientation signal that has been supplied from the gyrosensor 216 since a certain point in time through the current point in time and the predictor, the distortion correction unit 215 predictively calculates the magnitude of correction when the misalignment correction unit 213 following the distortion correction unit 215 corrects the display location of the image 700. As the predictor, a known circuit for predicting a detection value at the next point in time based on a plurality of detection values obtained at a plurality of points in time between the certain point in time and the current time may be used.

Figure 11:
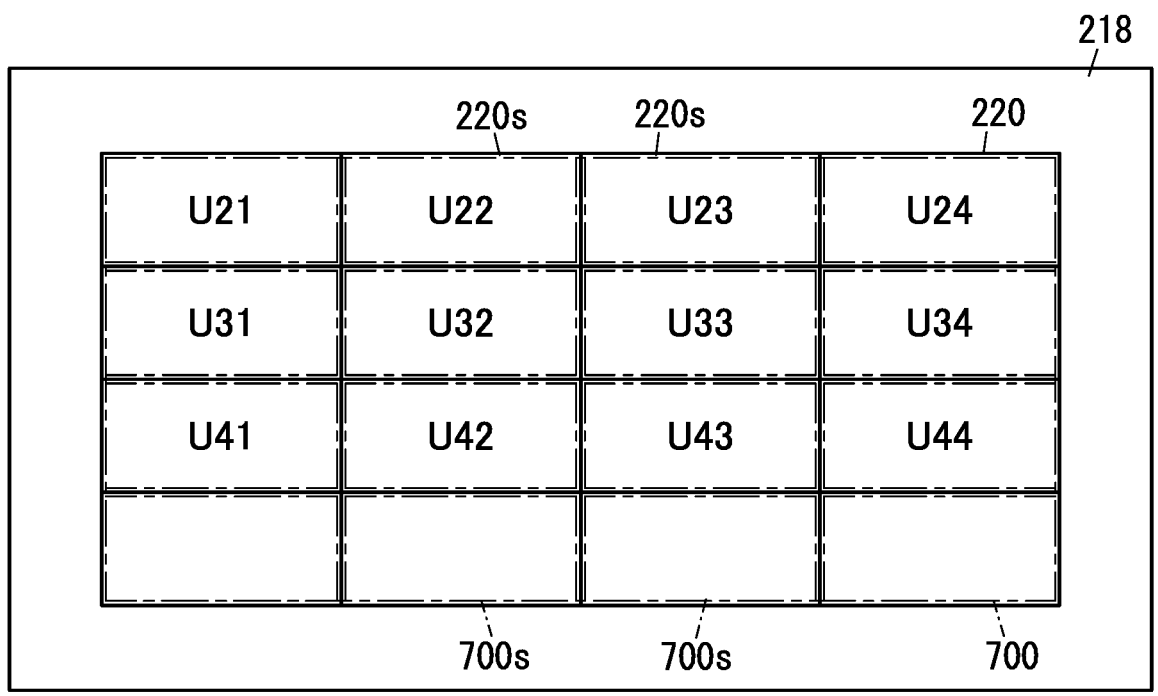
FIG. 11A is a schematic representation illustrating a state where distortion correction parameters are assigned to respective divisional areas for an image to be subjected to the distortion correction.
FIG. 11B is a schematic representation illustrating correspondence between respective divisional areas of a projection area on a windshield and distortion correction parameters.

Then, the distortion correction unit 215 reassigns, based on the magnitude of correction predicted, the distortion correction parameters U11-U44 associated with the respective divisional areas 25s of the display screen 25 to deviated divisional areas 25s as shown in FIG. 11B. Specifically, the distortion correction unit 215 reassigns the distortion correction parameters U11-U44 associated with the divisional areas 25s of the display screen 25 to divisional areas 25s which are located opposite from the direction of correction with the magnitude of correction predicted and which have the same magnitude of correction as the predicted one in order to cancel the magnitude of correction predicted. In the example illustrated in FIG. 11B, the magnitude of correction predicted is a value that causes the display location of the image 700 on the display unit 20 to be lowered by one divisional area 25s. In that case, the distortion correction unit 215 reassigns the distortion correction parameters U11-U44 to the divisional areas 25s which are shifted upward on the display screen 25 by one divisional area 25s in order to cancel the magnitude of correction predicted.

Note that in the example illustrated in FIG. 11B, the distortion correction parameters U11-U44 are reassigned to the divisional areas 25s which are shifted upward by one divisional area 25s. Thus, the four distortion correction parameters U11, U12, U13, U14 on the top row out of the distortion correction parameters U11-U44 are now outside of the display screen 25, and therefore, not shown in FIG. 11B. Meanwhile, the four divisional areas 25s forming the bottom row of the divisional areas 25s on the display screen 25 have no distortion correction that requires the reassignment, and therefore, no distortion correction parameters are shown in those four divisional areas 25s.

As can be seen, reassigning the distortion correction parameters U11-U44 deprives some of the respective divisional areas 25s on the display screen 25 (e.g., the four divisional areas 25s forming the bottom row out of the divisional areas 25s in FIG. 11B) of distortion correction parameters U11-U44. Thus, taking the reassignment of the distortion correction parameters U11-U44 into account, the distortion correction parameters U11-U44 may be set in a broader range than the display screen 25 when the distortion correction parameters U11-U44 are set initially on the display screen 25.

Then, the distortion correction unit 215 applies distortion correction to the respective image regions 700s of the image 700 based on the distortion correction parameters U11-U44 that have been reassigned to their associated divisional areas 25s on the display screen 25 as shown in FIG. 11A. In other words, the distortion correction unit 215 applies distortion correction to the respective image regions 700s of the image 700 based on the distortion correction parameters U11-U44 that have been reassigned to the respective divisional areas 25s on the display screen 25 where the respective image regions 700s of the image 700 are displayed. In the example illustrated in FIG. 11A, the distortion correction parameters U21-U44 of the distortion correction to be applied to the respective image regions 700s of the image 700 are shown in the respective image regions 700s. The distortion correction parameters U21-U44 shown in the respective image regions 700s correspond to the distortion correction parameters (see FIG. 11B) shown in the respective divisional areas 25s, corresponding to the image regions 700s, on the display screen 25.

Note that the respective divisional areas 25s of the display screen 25 correspond to the respective divisional areas 105s of the projection area 105. Thus, reassigning the distortion correction parameters U11-U44 to the respective divisional areas 25s of the display screen 25 causes the distortion correction parameters U11-U44 to be reassigned to the respective divisional areas 105s of the projection area 105 as well.

The image 700 that has been subjected to the distortion correction in this manner has its distortion correction range shifted by the magnitude of correction to be applied subsequently to the display location of the image 700 by the misalignment correction unit 213 following the distortion correction unit 215. That is to say, the respective image regions 700s of the image 700 have been subjected to the distortion correction with the distortion correction parameters U11-U44 that have been reassigned to the respective divisional areas 25s of the display screen 25 where the respective image regions 700s are displayed.

In the foregoing description, when the distortion correction range of the image 700 is shifted, attention is paid to the display screen 25 to reassign the distortion correction parameters U11-U44 to the respective divisional areas 25s of the display screen 25. However, the respective divisional areas 25s of the display screen 25, the respective divisional areas 105s of the projection area 105, and the respective divisional areas 220s of the storage area 220 correspond to each other. Thus, attention may be paid to the projection area 105, instead of the display screen 25, to reassign the distortion correction parameters U11-U44 to the respective divisional areas 105s of the projection area 105. Alternatively, attention may also be paid to the storage area 220, instead of the display screen 25, to reassign the distortion correction parameters U11-U44 to the respective divisional areas 220s of the storage area 220.

Then, the distortion correction unit 215 outputs the image 700 subjected to the distortion correction to the misalignment correction unit 213.

Figure 12:
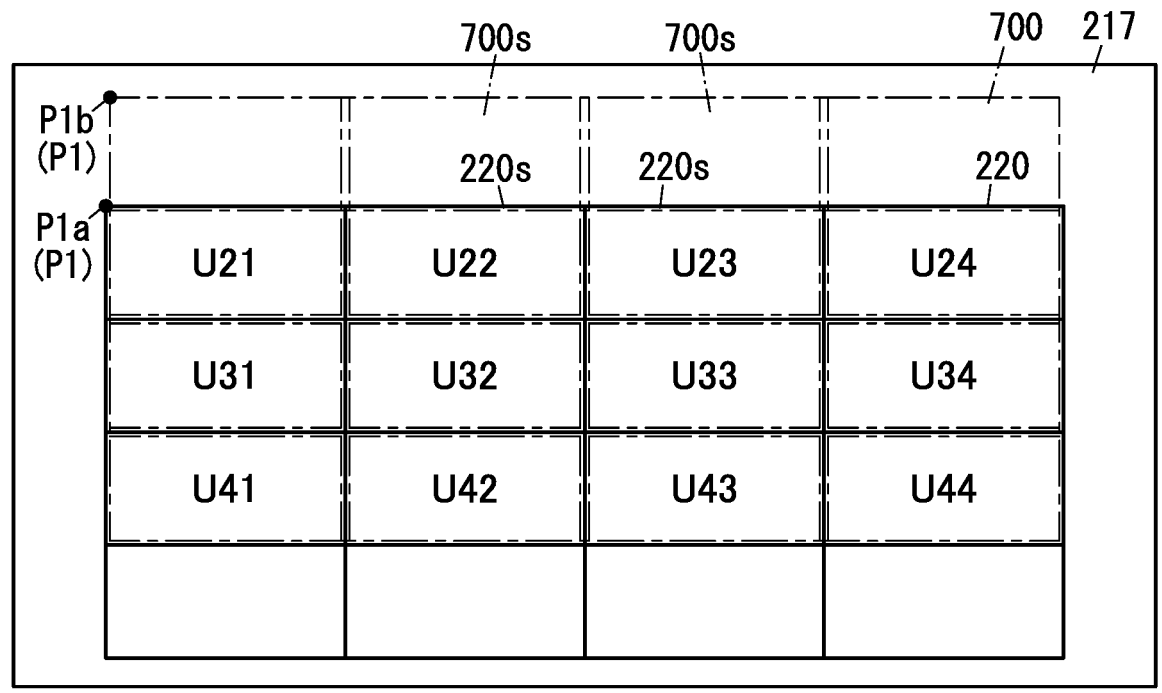
FIG. 12 is a schematic representation illustrating misalignment correction processing.
Figure 12:
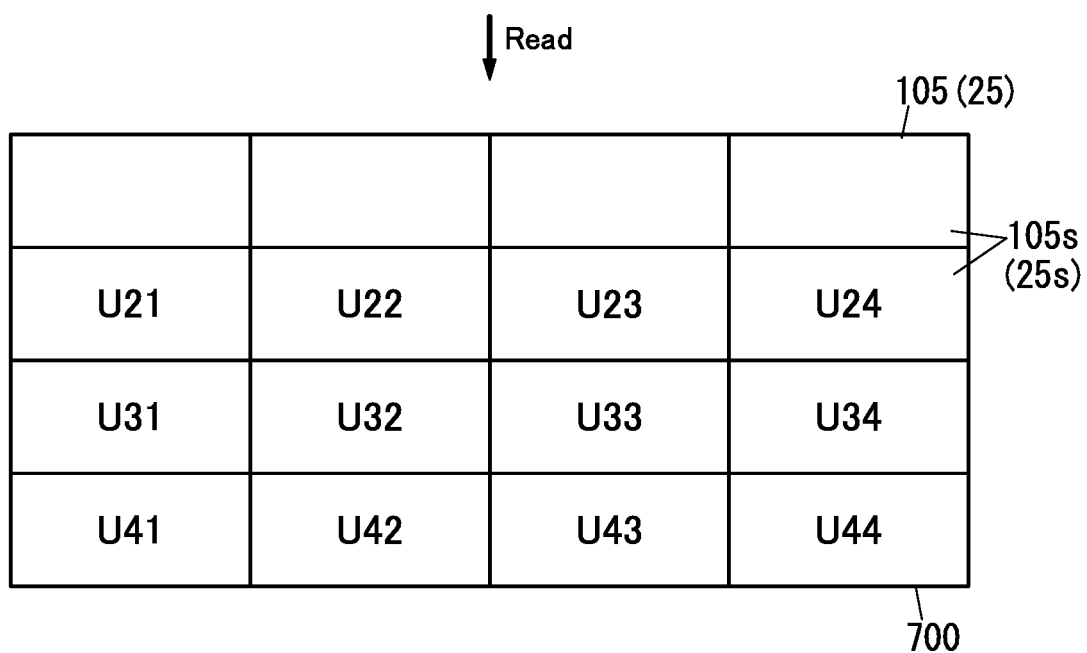

The misalignment correction unit 213 subjects, in accordance with the orientation signal supplied from the gyrosensor 216 (i.e., a signal indicating how the body 1 has changed its orientation), the image 700 supplied from the distortion correction unit 215 to misalignment correction. More specifically, the misalignment correction unit 213 temporarily retains, in the buffer memory 217, the image 700 supplied from the distortion correction unit 215 as shown in FIG. 12. Then, as in the first embodiment described above, the misalignment correction unit 213 obtains, in accordance with the orientation signal supplied from the gyrosensor 216, the magnitude of correction to applied to the display location of the image 700. The misalignment correction unit 213 subjects the image 700 retained to the misalignment correction as in the first embodiment described above.

In the example illustrated in FIG. 12, the misalignment correction unit 213 corrects the display location of the image 700 on the display unit 20 such that the image 700 is shifted downward by one image region 700s. Specifically, the misalignment correction unit 213 changes, in the buffer memory 217, the readout starting point P1 to a point P1b that is shifted upward by one image region 700s from the reference point P1a and reads out the image 700 retained. This allows the composition of the image 700 to be shifted downward by one image region as already described for the first embodiment. Consequently, the display location of the image 700 on the display unit 20 is shifted downward by one image region 700s.

As can be seen, correcting the display location of the image 700 through the misalignment correction made by the misalignment correction unit 213 allows the shift of the distortion correction range caused by the distortion correction unit 215 to be canceled. For example, even if the distortion correction range (i.e., the respective distortion correction parameters U11-U44) has been shifted upward by one image region 700s by the distortion correction unit 215 (see FIG. 11A), the image 700 is shifted downward by one image region 700s by the misalignment correction unit 213 following the distortion correction unit 215 (see FIG. 12). Thus, when the corrected image 700 is displayed on the display unit 20, the respective image regions 700s of the image 700 are corrected for with the original distortion correction parameters U11-U44 that have been assigned before the reassignment of the distortion correction parameters U11-U44 to the divisional areas 25s of the display screen 25 on the display unit 20 where the image regions 700s are displayed. Consequently, when the image 700 is projected onto the projection area 105, the distortion correction parameters U11-U44 assigned to the respective image regions 700s of the image 700 cancel the distortions produced in the corresponding divisional areas 105s of the projection area 105, thus making the virtual image 300 free of distortion.

(Variations)

Note that the first and second embodiments described above are only exemplary ones of various embodiments of the present disclosure and should not be construed as limiting. Rather, the first and second embodiments described above may be readily modified in various manners depending on a design choice or any other factor without departing from the scope of the present disclosure. Furthermore, the idea of the first and second embodiments described above does not have to be implemented as a single image display system 10. Alternatively, the idea of the first and second embodiments described above may also be implemented as a moving vehicle including the image display system 10 or a method for displaying an image using the image display system 10. Still alternatively, the idea of the first and second embodiments described above may also be implemented as a program designed to cause a computer to carry out the image display method described above or a storage medium that stores the program thereon. Note that the variations to be described below may be adopted in combination as appropriate.

(First Variation)

Figure 13:
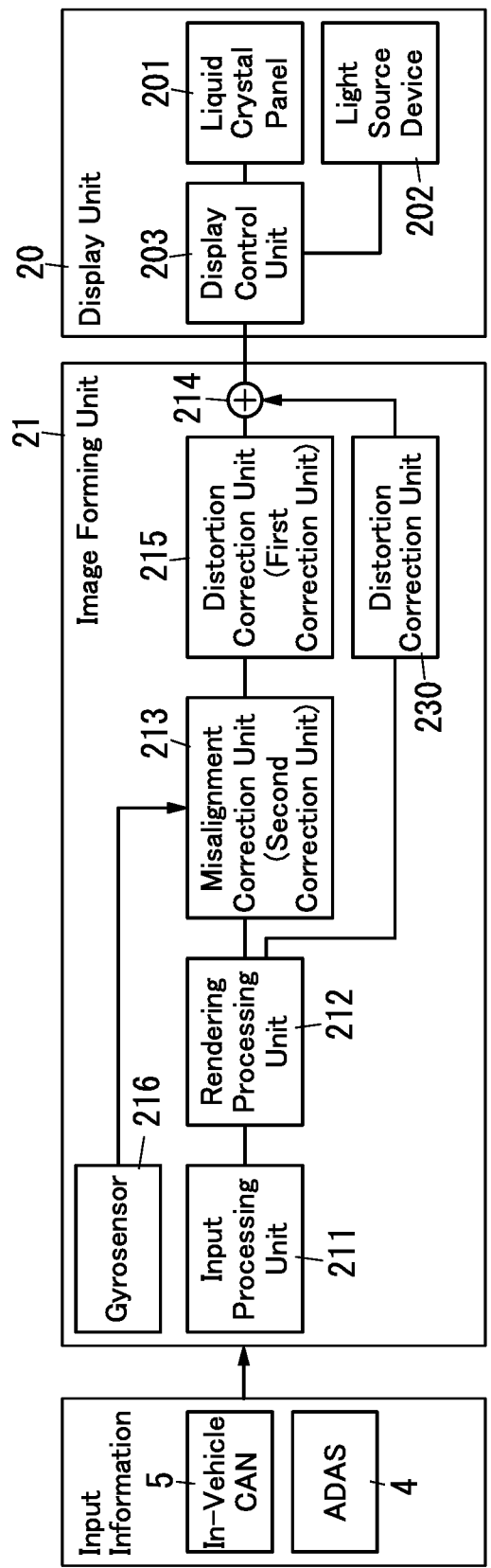
FIG. 13 is a block diagram illustrating a configuration for an image display system according to a variation.

In the first embodiment described above, the image synthesis unit 214 is arranged between the misalignment correction unit 213 and the distortion correction unit 215. Alternatively, the image synthesis unit 214 may also be arranged between the distortion correction unit 215 and the display unit 20 as shown in FIG. 13. In that case, another distortion correction unit 230 is additionally provided between the rendering processing unit 212 and the image synthesis unit 214. The distortion correction unit 230 may have the same configuration as the distortion correction unit 215. Specifically, the second image component 702 supplied from the rendering processing unit 212 is subjected to distortion correction by the distortion correction unit 230 and then output to the image synthesis unit 214. The image synthesis unit 214 synthesizes together the first image component 701 supplied from the distortion correction unit 215 and the second image component 702 supplied from the distortion correction unit 230 to form the image 700. Then, the image synthesis unit 214 outputs the image 700 thus formed to the display unit 20.

(Second Variation)

Figure 14:
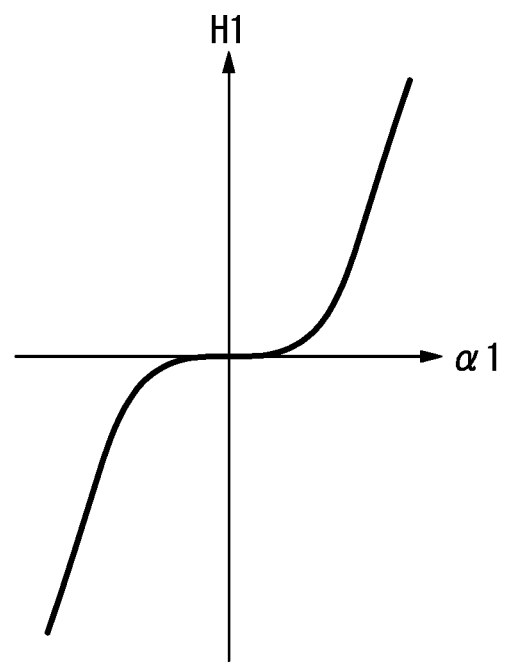
FIG. 14 is a graph showing an exemplary relationship between a variation in orientation and the magnitude of correction in the misalignment correction processing.

In the first embodiment described above, the magnitude of correction H1 to be applied by the misalignment correction unit 213 to the display location of the first image component 701 may change nonlinearly with the variation in the orientation (pitch angle $\alpha1$) of the body 1. In that case, the magnitude of correction H1 varies according to the magnitude of the variation $\alpha1$ as shown in FIG. 14. For example, if the variation $\alpha1$ is less than a predetermined value (i.e., when the variation $\alpha1$ is relatively small), then the magnitude of correction H1 may be set at a relatively small value or even zero. On the other hand, if the variation $\alpha1$ is equal to or greater than the predetermined value, then the magnitude of correction H1 may be proportional to the variation $\alpha1$. This allows the misalignment correction to be omitted if the variation $\alpha1$ in the orientation of the body 1 is relatively small (e.g., while the car 100 is idling) and to be made selectively only when the variation $\alpha1$ in the orientation of the body 1 is significant to a certain degree. This eliminates the need to correct the display location of the virtual image 300 with respect to tiny vibrations produced while the car 100 is idling. Optionally, the magnitude of correction H may be allowed to always vary linearly with respect to the variation $\alpha1$.

(Third Variation)

In the first embodiment described above, the buffer memory 218 of the distortion correction unit 215 is provided separately from the buffer memory 217 of the misalignment correction unit 213. Alternatively, a single buffer memory may be used in common as both of these buffer memories 218, 217.

(Fourth Variation)

In the first embodiment described above, the change in the orientation of the body 1 is a change in the pitch direction of the body 1. However, this is only an example of the present disclosure and should not be construed as limiting. Alternatively, the change in the orientation of the body 1 may also be a change in the yaw direction of the body 1. In that case, the readout starting point P1 may be changed to the right or to the left according to the yaw angle of the body 1, and the misalignment correction unit 213 corrects the display location of the image 700 in the rightward/leftward direction on the display screen 25. Then, the distortion correction unit 215 reassigns the distortion correction parameters U11-U44 already assigned to the respective divisional areas 25s of the display screen 25 to divisional areas 25s shifted in the rightward/leftward direction according to the magnitude of correction to the display location of the image 700. Still alternatively, the change in the orientation of the body 1 may also be a change in the roll direction. In that case, the image 700 is read out so as to be rotated according to the roll angle with respect to the readout starting point P1. In such a situation, the misalignment correction unit 213 corrects the display location of the image 700 such that the display location rotates around a predetermined point (i.e., readout starting point P1) on the display screen 25. Then, the distortion correction unit 215 reassigns the distortion correction parameters U11-U44 already assigned to the respective divisional areas 25s of the display screen 25 to divisional areas 25s shifted in the rotational direction around the predetermined point according to the magnitude of correction to the display location of the image 700. Note that the yaw direction herein refers to a direction around an axis in the upward/downward direction of the body 1 (i.e., the car 100) and the yaw angle herein refers to the angle of rotation in the yaw direction. Also, the roll direction herein refers to a direction around an axis in the forward/backward direction of the body 1 and the roll angle herein refers to the angle of rotation in the roll direction.

(Fifth Variation)

In the first embodiment described above, the projection unit 3 includes two optical elements. However, this is only an example of the present disclosure and should not be construed as limiting. Rather, the projection unit 3 has only to include at least one optical element. Thus, the two mirrors, namely, the first mirror 31 and the second mirror 32, do not have to be provided but only one mirror, or even three or more mirrors, may be provided. Optionally, the projection unit 3 may include a lens or any optical member other than the mirrors.

(Sixth Variation)

In the first embodiment described above, the image display system 10 is configured to project the virtual image 300 toward the target space 400 that is set in front of the car 100 traveling. However, this is only an example of the present disclosure and should not be construed as limiting. Alternatively, the image display system 10 may also project the virtual image 300 sideways, backward, or upward, for example, with respect to the traveling direction of the car 100.

(Seventh Variation)

In the first embodiment described above, the image display system 10 is implemented as a head-up display for use in cars 100. However, this is only an example of the present disclosure and should not be construed as limiting. Alternatively, the image display system 10 is also applicable for use in the body of moving vehicles other than the cars 100. Examples of such moving vehicles include bicycles, motorcycles, railway trains, aircrafts, construction machines, ships, and boats. Furthermore, the image display system 10 does not have to be used in a moving vehicle but may also be used in an amusement facility, for example. Still alternatively, the image display system 10 may also be used a wearable terminal such as a head mounted display (HMD), a piece of medical equipment, or a fixed device. Yet alternatively, the image display system 10 may also be used as, for example, an electronic viewfinder in digital cameras and other image capture devices.

(Eighth Variation)

In the first embodiment described above, the rendering processing unit 212, the distortion correction unit 215, the misalignment correction unit 213, and the display control unit 203 are each implemented as a set of a CPU and a memory independently of each other. However, this is only an example of the present disclosure and should not be construed as limiting. Alternatively, a single set of a CPU and a memory may also be used in common to perform the functions of the rendering processing unit 212, the distortion correction unit 215, the misalignment correction unit 213, and the display control unit 203. Still alternatively, a single set of a CPU and a memory may also be used in common to perform the functions of any three or two selected from the group consisting of the rendering processing unit 212, the distortion correction unit 215, the misalignment correction unit 213, and the display control unit 203.

(Ninth Variation)

Figure 15:
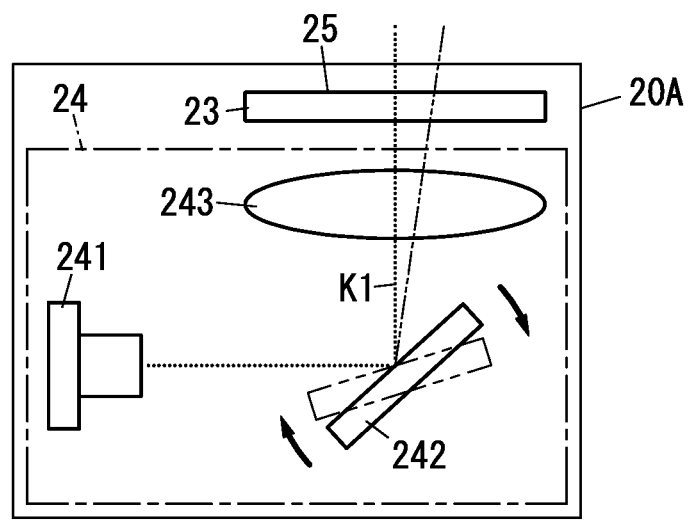
FIG. 15 is a schematic representation illustrating a variation of the display unit.

In the first embodiment described above, the display unit 20 includes the liquid crystal panel 201. However, this is only an example of the present disclosure and should not be construed as limiting. Alternatively, in this ninth variation, a display unit 20A is configured to form the image 700 by scanning the display screen 25 of the display unit 20A with a laser beam emitted from behind the display screen 25 as shown in FIG. 15.

More specifically, the display unit 20A includes a diffuse-transmission-type screen 23 and an irradiation unit 24 to irradiate the screen 23 with a light beam from behind the screen 23. The irradiation unit 24 is a scanning type irradiator to irradiate the screen 23 with a light beam K1. Thus, on the display screen 25 that is the front or rear surface (e.g., the front surface in this variation) of the screen 23, the image 700 is rendered with the light beam K1 coming from the irradiation unit 24. Meanwhile, a virtual image 300 (see FIG. 2) is formed in the target space 400 by the light beam K1 transmitted through the screen 23.

The irradiation unit 24 includes a light source 241 to emit a light beam (such as a laser beam) K1, a scanning unit 242 to scan the screen 23 with the light beam K1 emitted from the light source 241, and a lens 243. The light source 241 may be implemented as a laser module to emit the light beam K1. The scanning unit 242 reflects the light beam K1 coming from the light source 241 to irradiate the screen 23 with the light beam K1 through the lens 243. At this time, the scanning unit 242 scans the display screen 25 with the light beam K1 irradiating the screen 23 by changing the reflection direction of the light beam K1. In this case, the scanning unit 242 performs raster scanning by scanning the display screen 25 two-dimensionally (i.e., both vertically and horizontally) with the light beam K1. That is to say, the scanning unit 242 forms a two-dimensional image (such as the image 700) on the display screen 25 by scanning the display screen 25 with a light spot formed thereon. As used herein, the "light spot" refers to a spot where the light beam K1 crosses the display screen 25 of the screen 23. The scanning unit 242 includes a micro-scanning mirror formed by microelectromechanical systems (MEMS) technologies, for example. That is to say, the scanning unit 242 includes an optical element (mirror) that reflects the light beam K1 and rotates the optical element to reflect the light beam K1, coming from the light source 241, in a direction determined by the angle of rotation (deflection angle) of the optical element. In this manner, the scanning unit 242 scans the display screen 25 with the light beam K1 coming from the light source 241. The scanning unit 242 performs raster scanning of scanning the display screen 25 two-dimensionally with the light beam K1 by rotating the optical element along two axes that intersect with each other at right angles.

In this ninth variation, each of the plurality of divisional areas 25s on the display screen 25 of the display unit 20A may have any size without limitation. Optionally, each divisional area 25s may have the smallest size corresponding to the resolution of the display screen 25 of the display unit 20A. In other words, if the scanning unit 242 performs raster scanning by scanning the display screen 25 horizontally from top to bottom, going back to the starting point vertically, and then starting scanning the display screen 25 horizontally again, then the size of each divisional area 25s (including longitudinal and lateral dimensions) may correspond to the magnitude of the vertical movement. On the other hand, if the scanning unit 242 performs raster scanning by scanning the display screen 25 vertically from top to bottom, going back to the starting point horizontally, and then starting scanning the display screen 25 vertically again, then the size of each divisional area 25s may correspond to the magnitude of the horizontal movement.

(Tenth Variation)

In the first embodiment described above, the first image component 701 and second image component 702 are generated separately and then synthesized together to form the image 700. However, this is only an example of the present disclosure and should not be construed as limiting. Alternatively, the image 700 may also be formed without being separated into the first image component 701 and the second image component 702, and only a range, corresponding to the first image component 701, of the image 700 may be subjected to the misalignment correction, for example.

(Resume)

An image display system (10) according to a first aspect includes a display unit (20), a projection unit (3), and a body (1). The display unit (20) displays an image (700) thereon. The projection unit (3) projects a virtual image (300), corresponding to the image (700), onto a target space (400) using outgoing light of the display unit (20). The body (1) houses the display unit (20) and the projection unit (3). The image forming unit (21) forms the image (700) to be displayed on the display unit (20). The image forming unit (21) includes a first correction unit (215) and a second correction unit (213). The first correction unit (215) corrects for distortion of the image (700). The second correction unit (213) corrects a display location of the image (700) on the display unit (20) in accordance with an orientation signal representing a change in orientation of the body (1). A display screen (25) of the display unit (20) has a plurality of divisional areas (25s). The image (700) has a plurality of image regions (700s). Each of the plurality of divisional areas (25s) of the display screen (25) is assigned with a distortion correction parameter (U11-U44) for use to correct for the distortion of the virtual image (300). The first correction unit (215) applies distortion correction to each of the plurality of image regions (700s) on the display screen (25) based on a distortion correction parameter (U11-U44) assigned to a divisional area (25s) where the image region (700s) is displayed.

This configuration allows, even when the body (1) changes its orientation, misalignment between the virtual image (300) and the real-world environment to be reduced significantly with the distortion of the virtual image (300) corrected for. More specifically, providing the first correction unit (215) and the second correction unit (213) allows not only the distortion of the virtual image (300) to be corrected for but also the display location of the virtual image (300) to be corrected as well, as the body (1) changes its orientation. In this case, each of the plurality of divisional areas (25s) on the display screen (25) of the display unit (20) is assigned with a distortion correction parameter (U11-U44) for use to correct for the distortion of the virtual image (300). The first correction unit (215) applies distortion correction to each of the plurality of image regions (700s) of the image (700) based on the distortion correction parameter (U11-U44) assigned to the divisional area (25s) on the display screen (25) where the image region (700s) is displayed. This allows, even when the display location of the image (700) is corrected by the second correction unit (213), the distortion of the virtual image (300) to be corrected for appropriately through the distortion correction applied by the first correction unit (215).

In an image display system (10) according to a second aspect, which may be implemented in conjunction with the first aspect, the outgoing light of the display unit (20) is projected onto, and reflected from, a projection area (105) of a reflective member (101) to produce the virtual image (300) in the target space (400). The divisional areas (25s) of the display screen (25) are used as a plurality of first divisional areas (25s). The projection area (105) includes a plurality of second divisional areas (105s). The plurality of second divisional areas (105s) of the projection area (105) correspond one to one to the plurality of first divisional areas (25s) of the display screen (25). In each of the plurality of first divisional areas (25s) on the display screen (25), the distortion correction parameter (U11-U44) assigned to the first divisional area (25s) is also applicable to a corresponding one of the plurality of second divisional areas (105s) for the first divisional area (25s). In each of the plurality of first divisional areas (25s), the first correction unit (215) corrects for, using the distortion correction parameter (U11-U44), distortion to be produced when the outgoing light of the display unit (20) is reflected from the corresponding second divisional area (105s).

According to this configuration, the distortion correction parameter (U11-U44) is used to correct for the distortion produced when the outgoing light of the display unit (20) is reflected from the corresponding second divisional area (105s). This allows the distortion of the virtual image, produced when the outgoing light is reflected from the reflective member (101), to be corrected for.

In an image display system (10) according to a third aspect, which may be implemented in conjunction with the first or second aspect, the first correction unit (215) further corrects for the distortion of the image (700) that has been subjected to correction by the second correction unit (213).

According to this configuration, the correction by the second correction unit (213) (i.e., correction of the display location of the image (700)) is performed first, and then the correction by the first correction unit (215) (i.e., the distortion correction) is performed. This eliminates, when the correction is made by the first correction unit (215), the need of taking the change of the display location of the image (700) by the second correction unit (213) into account. Consequently, the processing load on the second correction unit (213) is lightened.

In an image display system (10) according to a fourth aspect, which may be implemented in conjunction with any one of the first to third aspects, the second correction unit (213) corrects a display location on the display unit (20) of the image (700) that has been subjected to distortion correction by the first correction unit (215). The first correction unit (215) predicts a magnitude of correction to be made when the second correction unit (213) corrects the display location of the image (700). The first correction unit (215) reassigns, on the display screen (25), the distortion correction parameter (U11-U44) to the divisional area (25s) shifted by the magnitude of correction predicted. Then, the first correction unit (215) applies distortion correction to the image region (700s) of the image (700) based on the distortion correction parameter (U11-U44) reassigned.

According to this configuration, the correction by the first correction unit (215) (i.e., the distortion correction) is performed first, and then the correction by the second correction unit (213) (i.e., correction of the display location of the image (700)) is performed. At this time, the first correction unit (215) reassigns, on the display screen (25), the distortion correction parameter (U11-U44) to the divisional area (25s) shifted by the magnitude of correction predicted. Then, the first correction unit (215) applies distortion correction to the image region (700s) of the image (700) based on the distortion correction parameter (U11-U44) reassigned. That is to say, after the distortion correction has been made, the display location of the image (700) is corrected. Thus, the correspondence between the distortion correction parameter (U11-U44) and the divisional areas (25s) on the display screen (25) is redefined on advance to cancel the correction to be applied to the display location. This allows, even when the distortion correction by the first correction unit (215) is made first and then the misalignment correction is made by the second correction unit (213), the distortion correction to be made properly by the first correction unit (215) without being affected by the misalignment correction by the second correction unit (213).

In an image display system (10) according to a fifth aspect, which may be implemented in conjunction with any one of the first to fourth aspects, the orientation signal is an output signal of a gyrosensor (216) to detect a change in the orientation of the body (1).

This configuration allows the angular velocity or angular acceleration of the body (1) to be detected as a change in the orientation of the body (1).

In an image display system (10) according to a sixth aspect, which may be implemented in conjunction with any one of the first to fifth aspects, the magnitude of the correction (H1) made by the second correction unit (213) to the display location of the image (700) is nonlinear with respect to a variation (al) in the orientation of the body (1).

This configuration allows, when the change in the orientation of the body (1) is insignificant, the magnitude of correction to be applied by the second correction unit (213) to be reduced sufficiently compared to the change in orientation, or even reduced to zero. In addition, this configuration also allows, when the change in the orientation of the body (1) is significant to a certain extent, the magnitude of correction to be made by the second correction unit (213) to be increased according to the variation in the orientation. This reduces, when the body (1) vibrates slightly, the chances of the virtual image (300) looking vibrating by having the vibration compensated for by the second correction unit (213).

In an image display system (10) according to a seventh aspect, which may be implemented in conjunction with any one of the first to sixth aspects, the image (700) displayed on the display unit (20) includes a first region (705) and a second region (706). The first region (705) is to be subjected to the correction by the second correction unit (213). The second region is to be subjected to no correction by the second correction unit (213).

This configuration allows a virtual image (300), of which the display location is corrected according to the change in the orientation of the body (1), and another virtual image (300), of which the display location is not corrected, to be displayed simultaneously as the virtual images (300).

An image display system (10) according to an eighth aspect, which may be implemented in conjunction with any one of the first to seventh aspects, further includes a sensor (216) to output the orientation signal.

This configuration provides an image display system (10) further including a sensor (216) for outputting the orientation signal.

A moving vehicle according to a ninth aspect includes the image display system (10) according to any one of the first to eighth aspects and a moving vehicle body (100). The moving vehicle body (100) is provided with the image display system (10).

This configuration provides a moving vehicle including the image display system (10) described above.

An image display method according to a tenth aspect is a method for displaying an image using an image display system (10) including a display unit (20), a projection unit (3), and a body (1). The display unit (20) displays an image (700) thereon. The projection unit (3) projects a virtual image (300), corresponding to the image (700), onto a target space (400) using outgoing light of the display unit (20). The body (1) houses the display unit (20) and the projection unit (3). The image display method includes image forming processing. The image forming processing is processing of forming the image (700) to be displayed on the display unit (20). The image forming processing includes a first correction process and a second correction process. The first correction process includes correcting for distortion of the image (700). The second correction process includes correcting a display location of the image (700) on the display unit (20) in accordance with an orientation signal representing a change in orientation of the body (1). A display screen (25) of the display unit (20) has a plurality of divisional areas (25s). The image (700) has a plurality of image regions (700s). Each of the plurality of divisional areas (25s) of the display screen (25) is assigned with a distortion correction parameter (U11-U44) for use to correct for the distortion of the virtual image (300). The first correction process includes a distortion correction process. The distortion correction process includes applying distortion correction to each of the plurality of image regions (700s) on the display screen (25) based on a distortion correction parameter (U11-U44) assigned to a divisional area (25s) where the image region (700s) is displayed.

This aspect allows, even when the body (1) changes its orientation, misalignment between the virtual image (300) and the real-world environment to be reduced significantly with the distortion of the virtual image (300) corrected for. More specifically, performing the first correction process and the second correction process allows not only the distortion of the virtual image (300) to be corrected for but also the display location of the virtual image (300) to be corrected as the body (1) changes its orientation. In this case, each of the plurality of divisional areas (25s) on the display screen (25) of the display unit (20) is assigned with a distortion correction parameter (U11-U44) for use to correct for the distortion of the virtual image (300). The first correction process includes applying distortion correction to each of the plurality of image regions (700s) of the image (700) based on the distortion correction parameter (U11-U44) assigned to the divisional area (25s) on the display screen (25) where the image region (700s) is displayed. This allows, even though the display location of the image (700) is corrected through the second correction process, the distortion of the virtual image (300) to be corrected for appropriately through the distortion correction made in the first correction process.

A program according to an eleventh aspect is designed to cause a computer to carry out the image display method according to the tenth aspect.

This configuration allows, even with a general-purpose computer, the misalignment between the virtual image (300) and the real-world environment to be reduced even if the body (1) changes its orientation, with the distortion of the virtual image (300) corrected for.

While various embodiments have been described herein above, it is to be appreciated that various changes in form and detail may be made without departing from the spirit and scope of the present disclosure presently or hereafter claimed.

In this application, the entire contents of Japanese Patent Application No. 2018-069740 mentioned above are hereby incorporated by reference for all purposes.

The invention claimed is:

1. An image display system comprising:
a body in which a display displays an image thereon is provided, the body projecting a virtual image, corresponding to the image, onto a target space using outgoing light of the display, and the body installed in a moving vehicle body; and
an image forming unit that forms the image to be displayed on the display, wherein:
the image forming unit includes:
a processor; and
a memory including at least one set of instructions that causes the processor to perform operations when executed by the processor, the operations including:
correcting for distortion of the image; and
correcting, on the display, a display location of the image that has been subjected to the correcting for distortion, in accordance with an orientation signal representing a change in orientation of the moving vehicle body,
a display screen of the display has a plurality of divisional areas,
the image has a plurality of image regions,
each of the plurality of divisional areas of the display screen is assigned with a distortion correction parameter for use to correct for the distortion of the virtual image, and
the correcting for distortion:
is applied to each of the plurality of image regions on the display screen based on a distortion correction parameter assigned to a divisional area where the image region is displayed,
predicts a magnitude of correction to be made when the display location of the image is corrected, the predicted magnitude of the correction being nonlinear with respect to a variation in the orientation of the moving vehicle body,
reassigns, on the display screen, the distortion correction parameter to the divisional area shifted by the magnitude of correction predicted, and
applies the distortion correction to the image region of the image based on the distortion correction parameter reassigned.

2. The image display system of claim 1, wherein
the outgoing light of the display is projected onto, and reflected from, a projection area of a reflective member to produce the virtual image in the target space, the divisional areas of the display screen are used as a plurality of first divisional areas, the projection area includes a plurality of second divisional areas, the plurality of second divisional areas of the projection area correspond one to one to the plurality of first divisional areas of the display screen, in each of the plurality of first divisional areas of the display screen, the distortion correction parameter assigned to the first divisional area is also applicable to a corresponding one of the plurality of second divisional areas for the first divisional area, and in each of the plurality of first divisional areas, the correcting for distortion further comprises, using the distortion correction parameter, correcting for distortion to be produced when the outgoing light is reflected from the corresponding second divisional area.

3. The image display system of claim 1, wherein
the correcting for distortion further comprises correcting for the distortion of the image that has been subjected to the correcting the display location.

4. The image display system of claim 1, wherein
the orientation signal is an output signal of a gyrosensor that detects a change in the orientation of the moving vehicle body.

5. The image display system of claim 1, wherein the image displayed on the display includes:
a first region to be subjected to the correcting the display location; and
a second region not to be subjected to correcting the display location.

6. The image display system of claim 1, further comprising a sensor that outputs the orientation signal.

7. A moving vehicle comprising:
the image display system of claim 1;
a projector that is housed in the image display system and that is configured to project the virtual image onto a target space using outgoing light of the display; and
the moving vehicle body provided with the image display system.

8. A method for displaying an image using an image display system, the image display system including a body installed in moving vehicle body and in which a display that displays an image thereon is provided, the body projecting a virtual image corresponding to the image onto a target space using outgoing light of the display, the method comprising:

image forming processing to form the image to be displayed on the display, the image forming processing including:
a first correction process of correcting for distortion of the image; and
a second correction process of correcting, on the display, a display location of the image that has been subjected to the correcting for distortion, in accordance with an orientation signal representing a change in orientation of the moving vehicle body, wherein:
a display screen of the display has a plurality of divisional areas,
the image having a plurality of image regions,
each of the plurality of divisional areas of the display screen is assigned with a distortion correction parameter for use to correct for the distortion of the virtual image, and
the first correction process:
applies distortion correction to each of the plurality of image regions on the display screen based on a distortion correction parameter assigned to a divisional area where the image region is displayed,
predicts a magnitude of correction to be made when the display location of the image is corrected, the predicted magnitude of the correction being nonlinear with respect to a variation in the orientation of the moving vehicle body,
reassigns, on the display screen, the distortion correction parameter to the divisional area shifted by the magnitude of correction predicted, and
applies the distortion correction to the image region of the image based on the distortion correction parameter reassigned.

9. A non-transitory computer-readable storage medium that stores an executable program designed to cause a computer to carry out the image display method of claim 8.

* * * * *